(12) United States Patent
Tsukagoshi et al.

(10) Patent No.: US 12,533,092 B2
(45) Date of Patent: Jan. 27, 2026

(54) MEDICAL IMAGE PROCESSING APPARATUS AND MEDICAL IMAGE PROCESSING METHOD

(71) Applicant: CANON MEDICAL SYSTEMS CORPORATION, Otawara (JP)

(72) Inventors: Shinsuke Tsukagoshi, Nasushiobara (JP); Hiroki Taguchi, Otawara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 258 days.

(21) Appl. No.: 18/524,139

(22) Filed: Nov. 30, 2023

(65) Prior Publication Data
US 2024/0188911 A1    Jun. 13, 2024

(30) Foreign Application Priority Data
Dec. 8, 2022   (JP) ................. 2022-196542

(51) Int. Cl.
*A61B 6/42* (2024.01)
*A61B 6/03* (2006.01)
*G06T 5/40* (2006.01)
*G06T 11/00* (2006.01)
*G06V 10/25* (2022.01)

(52) U.S. Cl.
CPC ............ *A61B 6/4241* (2013.01); *A61B 6/032* (2013.01); *G06T 5/40* (2013.01); *G06T 11/008* (2013.01); *G06V 10/25* (2022.01)

(58) Field of Classification Search
CPC ......... A61B 6/4241; A61B 6/032; A61B 6/03; A61B 6/482; A61B 6/5205; A61B 6/5217; G06T 5/40; G06T 11/008; G06V 10/25
See application file for complete search history.

(56) References Cited

U.S. PATENT DOCUMENTS

2016/0054453 A1\* 2/2016 Moriyasu ............. A61B 6/4035
378/19

FOREIGN PATENT DOCUMENTS

JP    2019-90674 A    6/2019

\* cited by examiner

*Primary Examiner* — Courtney D Thomas
(74) *Attorney, Agent, or Firm* — Oblon, McClelland, Maier & Neustadt, L.L.P.

(57) ABSTRACT

A medical image processing apparatus according to one embodiment includes processing circuitry. The processing circuitry acquires a plurality of pieces of energy bin data that are generated based on execution of photon counting CT scan. The processing circuitry reconstructs a plurality of energy band images based on the plurality of pieces of energy bin data. The processing circuitry generates, based on the plurality of energy band images, a three-dimensional histogram based on a plurality of pixel values and a plurality of energy bands included in the plurality of energy band images.

10 Claims, 13 Drawing Sheets

MEDICAL IMAGE PROCESSING APPARATUS AND MEDICAL IMAGE PROCESSING METHOD

CROSS-REFERENCE TO RELATED APPLICATIONS

This application is based upon and claims the benefit of priority from Japanese Patent Application No. 2022-196542, filed on Dec. 8, 2022, the entire contents of which are incorporated herein by reference.

FIELD

Embodiments described herein relate generally to a medical image processing apparatus and a medical image processing method.

BACKGROUND

Conventionally, a technology for, when a Region Of Interest (ROI) is set in a Computed Tomography (CT) image that is displayed on a display, calculating and displaying an average value of CT values, a standard deviation of the CT values, a maximum value of the CT values, a minimum value of the CT values, an area of the ROI, a frequency distribution of the CT values, or the like by using a plurality of pixels included in the ROI is known. In this case, it is possible to appropriately set and select a calculation target that is to be displayed.

Further, another technology for generating a medical image that is specific to a plurality of energies by photon counting CT scan (hereinafter, referred to as PCCT scan) that is able to distinguish a plurality of energies. In this case, if an analysis value that is specific to the PCCT scan is to be calculated and displayed with respect to an ROI that is set in the medical image, it is needed to activate an analysis application related to the PCCT scan and perform calculation related to the analysis value that is designated by a user. Therefore, when the analysis value that is specific to the PCCT scan is to be displayed on the display, in some cases, it takes time and effort due to activation of the analysis application.

DETAILED DESCRIPTION

A medical image processing apparatus according to one embodiment includes processing circuitry. The processing circuitry acquires a plurality of pieces of energy bin data that are generated based on execution of photon counting CT scan. The processing circuitry reconstructs a plurality of energy band images based on the plurality of pieces of energy bin data. The processing circuitry generates, based on the plurality of energy band images, a three-dimensional histogram that is based on a plurality of pixel values and a plurality of energy bands included in the plurality of energy band images.

A processing apparatus (medical image processing apparatus) for a medical image that is obtained by photon counting CT scan (hereinafter, referred to as PCCT scan) and a method (medical image processing method) for processing the medical image that is obtained by the PCCT scan will be described below with reference to the drawings. Here, the PCCT scan corresponds to CT scan that is able to distinguish a plurality of energies (two or more energies) with respect to X-rays. The PCCT scan may be referred to as spectral imaging. In one embodiment, it is assumed that components denoted by the same reference symbols perform the same operation, and repeated explanation will be omitted appropriately.

Embodiment

Figure 1:
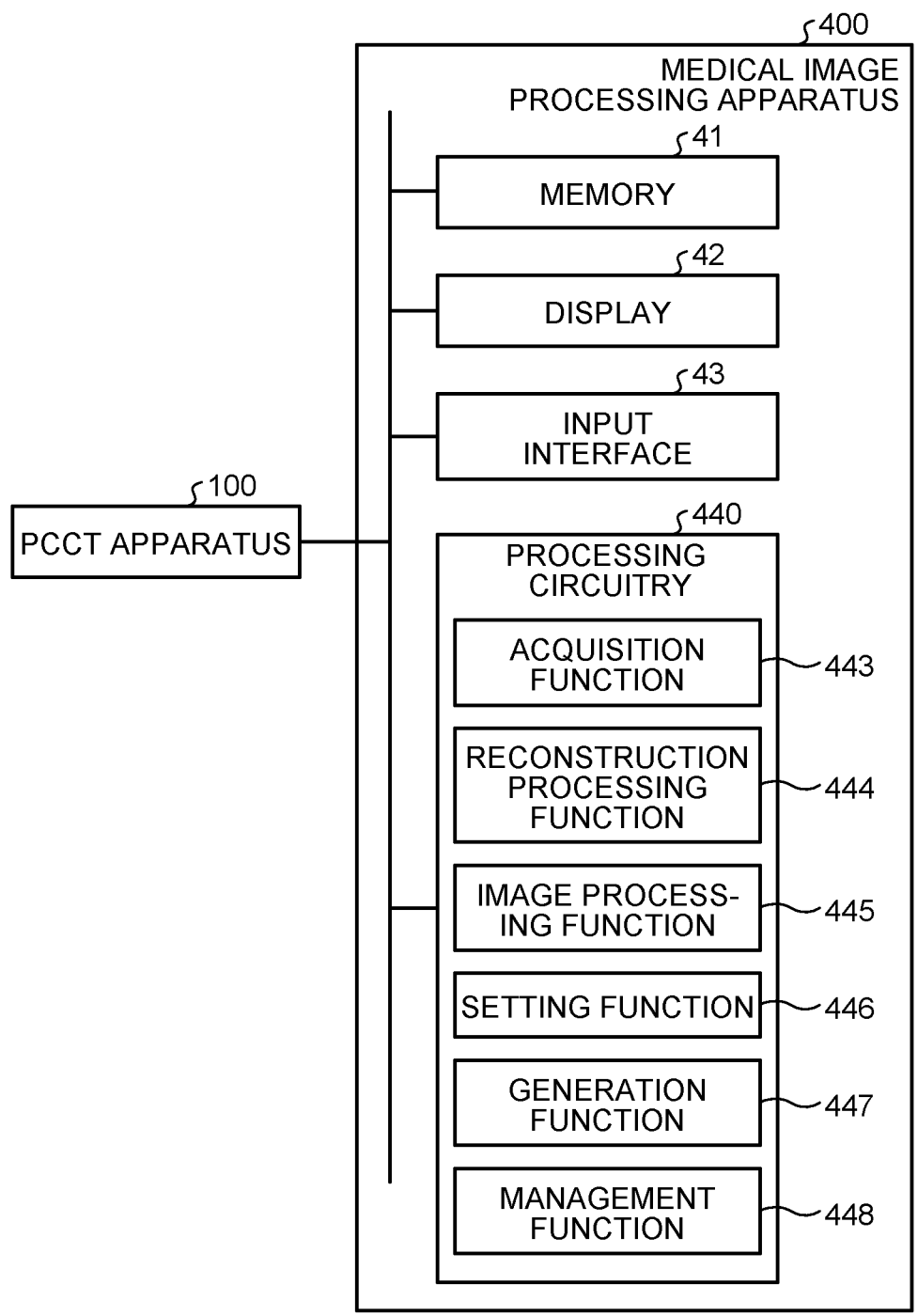
FIG. 1 is a diagram illustrating an example of a configuration of a medical image processing apparatus according to one embodiment.

FIG. 1 is a diagram illustrating an example of a configuration of a medical image processing apparatus 400 according to one embodiment. As illustrated in FIG. 1, the medical image processing apparatus 400 includes a memory 41, a display 42, an input interface 43, and processing circuitry 440. The medical image processing apparatus 400 is connected to a PCCT apparatus 100 in a wired or wireless manner. The PCCT apparatus 100 is a photon X-ray Computed Tomography (CT) apparatus that is able to distinguish a plurality of energies.

Further, the medical image processing apparatus 400 is implemented by, for example, a medical image processing server (workstation or the like), a Picture Archiving and Communication System (PACS) server, a radiogram interpretation terminal or the like that performs medical image processing. That is, a medical image processing method according to one embodiment may be implemented by various kinds of server apparatuses, in other words, a server apparatuses that are able to execute, as a program, the flow of processes implemented by the medical image processing method.

Meanwhile, the medical image processing apparatus 400 that implements the medical image processing method as described above may be mounted on an X-ray CT apparatus (the PCCT apparatus 100) that is able to perform PCCT scan. For example, the medical image processing apparatus 400 is mounted on a console apparatus in the PCCT apparatus 100. In the following, to provide concrete explanation, explanation will be given based on the assumption that the medical image processing apparatus 400 is mounted on the PCCT apparatus 100.

Meanwhile, the medical image processing apparatus 400 that implements technical features according to one embodiment need not always be mounted on the PCCT apparatus, but may be mounted on, for example, a composite apparatus of a nuclear medicine diagnosis apparatus, such as a Positron Emission Tomography (PET) or a Single Photon Emission Computed Tomography (SPECT), and a PCCT apparatus.

Figure 2:
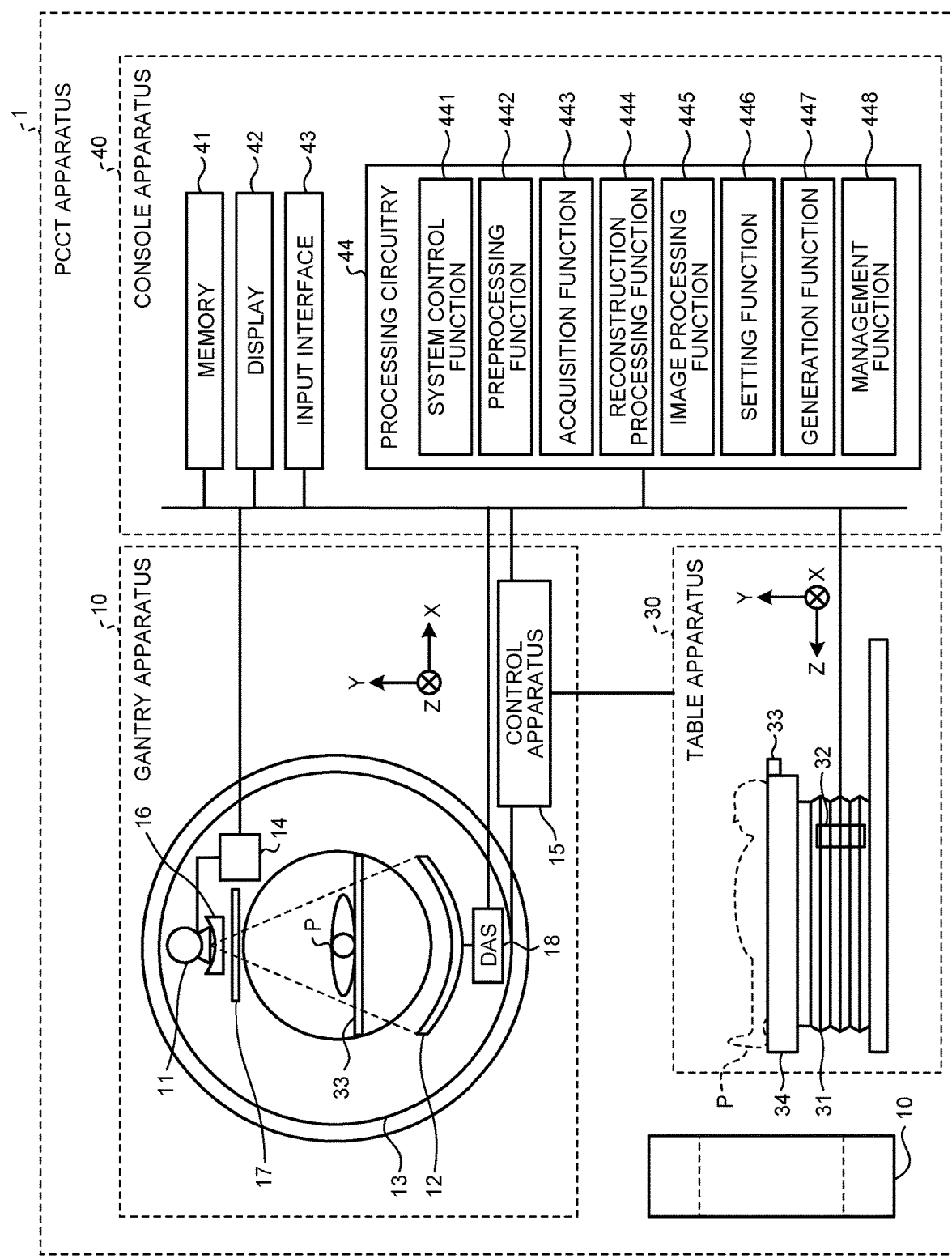
FIG. 2 is a diagram illustrating a configuration example of a PCCT apparatus according to one embodiment.

FIG. 2 is a diagram illustrating a configuration example of a PCCT apparatus 1 according to one embodiment. As illustrated in FIG. 2, the PCCT apparatus 1 includes a gantry apparatus 10 that is also referred to as a gantry, a table apparatus 30, and a console apparatus 40. The medical image processing apparatus 400 that implements the technical features of one embodiment is mounted on the console apparatus 40 as illustrated in FIG. 2.

Meanwhile, in the present embodiment, a longitudinal direction of a rotation axis of a rotary frame 13 in a non-tilt state is defined as a Z-axis direction, a direction that is perpendicular to the Z-axis direction and that extends toward a support that supports the rotary frame 13 from a center of rotation is defined as an X axis, and a direction that is perpendicular to the Z axis and the X axis is defined as a Y axis. In FIG. 2, the gantry apparatus 10 is illustrated multiple times for convenience of explanation; however, as an actual configuration of the PCCT apparatus 1, the single gantry apparatus 10 is provided.

The gantry apparatus 10 and the table apparatus 30 operate based on operation that is performed by an operator via the console apparatus 40 or based on operation that is performed by a user via an operating unit arranged in the gantry apparatus 10 or the table apparatus 30. The user is, for example, a doctor, a radiographer, a serviceman related to the PCCT apparatus 1, or the like. The gantry apparatus 10, the table apparatus 30, and the console apparatus 40 are communicably connected to one another in a wired or wireless manner.

The gantry apparatus 10 is an apparatus that includes an image capturing system that applies X-rays to a subject P and collects projection data from detection data of the X-rays that have transmitted through the subject P. The gantry apparatus 10 includes an X-ray tube 11, an X-ray detector 12, the rotary frame 13, an X-ray high-voltage apparatus 14, a control apparatus 15, a wedge 16, a collimator 17, and a Data Acquisition System (DAS) 18.

The X-ray tube 11 is a vacuum tube that generates X-rays by applying a thermal electron from a cathode (filament) to an anode (target) by application of high voltage and supply of a filament current from the X-ray high-voltage apparatus 14. The X-rays are generated by collision of the thermal electron against the target. The X-rays generated at a tube focus in the X-ray tube 11 transmit through an X-ray radiation window in the X-ray tube 11, are formed in, for example, a cone beam shape via the collimator 17, and are applied to the subject P. The X-ray tube 11 includes, for example, a rotary anode type X-ray tube that generates X-rays by applying a thermal electron to a rotating anode.

The X-ray detector 12 detects photons of the X-rays generated by the X-ray tube 11. Specifically, the X-ray detector 12 detects, in units of photons, the X-rays that are emitted from the X-ray tube 11 and that have transmitted through the subject P, and outputs an electrical signal corresponding to an amount of the X-rays to the DAS 18. That is, the X-ray detector 12 is implemented by a photon counting X-ray detector. The X-ray detector 12 includes a plurality of detection element arrays in each of which a plurality of detection elements (also referred to as X-ray detection elements) in a fan angle direction (also referred to as a channel direction) along a single circular arc about, for example, a focal point of the X-ray tube 11. In the X-ray detector 12, the plurality of detection element arrays are flatly arranged along the Z-axis direction. That is, the X-ray detector 12 has a structure in which, for example, the plurality of detection element arrays are flatly arranged in a cone angle direction (also referred to as a column direction, a row direction, or a slice direction).

Meanwhile, the PCCT apparatus 1 includes various types, such as a Rotate/Rotate-Type (the third-generation CT) in which the X-ray tube 11 and the X-ray detector 12 integrally rotate around the subject P and a Stationary/Rotate-Type (the fourth-generation CT) in which a large number of X-ray detection elements arrayed in a ring manner are fixed and only the X-ray tube 11 rotates around the subject P, and any type is applicable to the present embodiment.

The X-ray detector 12 is an X-ray detector of a direct conversion type that includes a semiconductor element for converting incident X-rays to charges. The X-ray detector 12 of the present embodiment includes, for example, at least a single high voltage electrode, at least a single semiconductor crystal, and a plurality of read-out electrodes. The semiconductor element is also referred to as an X-ray conversion element. The semiconductor crystal is implemented by, for example, cadmium telluride (CdTe), cadmium Zinc telluride (CdZnTe) (CZT), or the like. In the X-ray detector 12, electrodes are arranged on two surfaces that face each other across the semiconductor crystal and that are perpendicular to the Y direction. That is, in the X-ray detector 12, a plurality of anode electrodes (also referred to as read-out electrodes or pixel electrodes) and cathode electrodes (also referred to as common electrodes) are arranged across the semiconductor crystal.

Bias voltage is applied between the read-out electrodes and the common electrodes. In the X-ray detector 12, when the X-rays are absorbed by the semiconductor crystal, an electron-hole pair is generated, an electron moves to the anode side (the anode electrode (read-out electrode) side), and a hole moves to the cathode side (the cathode electrode side), so that a signal related to detection of the X-rays is output from the X-ray detector 12 to the DAS 18.

Meanwhile, the X-ray detector 12 may be a photon counting X-ray detector of an indirect conversion type that indirectly converts incident X-rays to an electrical signal. The X-ray detector 12 is one example of an X-ray detection unit.

The rotary frame 13 is an annular frame that supports the X-ray tube 11 and the X-ray detector 12 such that the X-ray tube 11 and the X-ray detector 12 face each other, and causes the control apparatus 15 (to be described later) to rotate the X-ray tube 11 and the X-ray detector 12. Meanwhile, the rotary frame 13 further includes and supports the X-ray high-voltage apparatus 14 and the DAS 18, in addition to the X-ray tube 11 and the X-ray detector 12. The rotary frame 13 is supported, in a rotatable manner, by a non-rotary portion (for example, a fixed frame (not illustrated in FIG. 2)) of the gantry apparatus 10. A rotation mechanism includes, for example, a motor that generates a rotation driving force and a bearing that transmits the rotation driving force to the rotary frame 13 and rotates the rotary frame 13. The motor is arranged in, for example, the non-rotary portion, the bearing is physically connected to the rotary frame 13 and the motor, and the rotary frame 13 rotates in accordance with a rotation force of the motor.

Communication circuitry of a contactless type or a contact type is arranged in each of the rotary frame 13 and the non-rotary portion, and allows communication between units supported by the rotary frame 13 and the non-rotary portion or between the gantry apparatus 10 and an external apparatus. For example, when optical communication is adopted as a contactless communication method, detection data that is generated by the DAS 18 is transmitted, by the optical communication, from a transmitter that is arranged in the rotary frame 13 and that includes a light emitting diode (LED) to a receiver that is arranged in the non-rotary portion of the gantry apparatus 10 and that includes a photodiode, and further transferred, by the transmitter, from the non-rotary portion to the console apparatus 40. Meanwhile, as the communication method, it may be possible to adopt a contactless-type data transfer method, such as a capacitive coupling method or a radio method, and a contact-type data transfer method using a slip ring and an electrode brush. Further, the rotary frame 13 is one example of a rotation unit.

The X-ray high-voltage apparatus 14 includes electrical circuitry, such as a transformer and a rectifier, a high-voltage generator that has a function to generate high voltage to be applied to the X-ray tube 11 and a filament current to be supplied to the X-ray tube 11, and an X-ray control apparatus that controls output voltage corresponding to X-rays applied by the X-ray tube 11. The high-voltage generator may be of a transformer type or an inverter type. Meanwhile, the X-ray high-voltage apparatus 14 may be arranged on the rotary frame 13 or at the side of the fixed frame of the gantry apparatus 10. Further, the X-ray high-voltage apparatus 14 is one example of an X-ray high voltage unit.

The control apparatus 15 includes processing circuitry including a Central Processing Unit (CPU) or the like, and a driving mechanism, such as a motor and an actuator. The processing circuitry includes, as hardware resources, a processor, such as a CPU or a Micro Processing Unit (MPU), and a memory, such as a Read Only Memory (ROM) or a Random Access Memory (RAM).

Further, the control apparatus 15 may be implemented by, for example, a processor, such as a Graphics processing Unit (GPU), an Application Specific Integrated Circuit (ASIC), a Programmable Logic Device (for example, a Simple Programmable Logic Device (SPLD), a Complex Programmable Logic Device (CPLD), and a Field Programmable Gate Array (FPGA)).

If the processor is, for example, a CPU, the processor reads a program that is stored in the memory and executes the program to implement a function. In contrast, if the processor is an ASIC, the function is directly incorporated, as logic circuitry, in circuitry of the processor, instead of storing the program in the memory. Meanwhile, each of the processors of the present embodiment need not always be configured as single circuitry for each of the processors, but it may be possible to construct a single processor by combining a plurality of independent circuitry and implement corresponding functions. Furthermore, it may be possible to integrate a plurality of components into a single processor and implement corresponding functions.

The control apparatus 15 has a function to receive an input single from an input interface that is attached to the console apparatus 40 or the gantry apparatus 10, and control operation of the gantry apparatus 10 and the table apparatus 30. For example, the control apparatus 15 performs control of rotating the rotary frame 13, control of tilting the gantry apparatus 10, and control of operating the table apparatus 30 and a tabletop 33 upon receiving the input signal. Meanwhile, the control of tilting the gantry apparatus 10 may be realized such that the control apparatus 15 causes the rotary frame 13 to rotate about an axis that is parallel to the X-axis direction based on inclination angle (tilt angle) information that is input through the input interface attached to the gantry apparatus 10.

The control apparatus 15 controls various components, such as the gantry apparatus 10 and the table apparatus 30, that are related to execution of photon counting CT scan, in accordance with an image capturing protocol including a scan condition (also referred to as an imaging condition) based on an examination order. The photon counting CT scan is not conventional integral-type CT scan, but CT scan for counting each photon, for example.

Meanwhile, the control apparatus 15 may be arranged on the gantry apparatus 10 or may be arranged on the console apparatus 40. Further, the control apparatus 15 may be configured such that a program is directly incorporated in circuitry of the processor, instead of storing the program in the memory. Furthermore, the control apparatus 15 is one example of a control unit.

The wedge 16 is a filter for adjusting an X-ray dose of the X-rays emitted from the X-ray tube 11. Specifically, the wedge 16 is a filter that transmits and attenuates the X-rays emitted from the X-ray tube 11 such that a distribution of the X-rays applied from the X-ray tube 11 to the subject P has a certain form that is determined in advance. The wedge 16 is, for example, a wedge filter or a bow-tie filter, and is a filter that is formed by processing aluminum so as to have a predetermined target angle and a predetermined thickness.

The collimator 17 is a lead plate or the like for condensing the X-rays that have transmitted through the wedge 16 into an X-ray irradiation range, and a slit is formed by combining a plurality of lead plates or the like. Meanwhile, the collimator 17 may also be referred to as an X-ray aperture.

The Data Acquisition System (DAS) 18 includes a plurality of counting circuitry. Each counting circuitry includes an amplifier that performs an amplification process on an electrical signal that is output from each of the detection elements of the X-ray detector 12 and an A/D converter that converts the amplified electrical signal to a digital signal, and generates detection data that is a result of a counting process using the detection signal of the X-ray detector 12. The result of the counting process is data in which the number of photons of the X-rays per energy bin is assigned. The energy bin corresponds to an energy range with a predetermined width. For example, the DAS 18 counts photons (X-ray photons) derived from the X-rays that are emitted by the X-ray tube 11 and that have transmitted through the subject P, and generates, as the detection data, a result of the counting process while distinguishing energies of the counted photons. The DAS 18 is one example of a data collection unit.

The detection data that is generated by the DAS 18 is transferred to the console apparatus 40. The detection data is a set of pieces of data indicating a channel number and a column number of the detection element that has generated the data, a view number indicating a collected view (also referred to as a projection angle), and a value indicating the dose of the detected X-rays. Meanwhile, as the view number, it may be possible to use a sequence number (collection time) at which the view is collected, or a number (for example, 1 to 1000) that indicates a rotation angle of the X-ray tube 11. Each of the plurality of counting circuitry in the DAS 18 is implemented by, for example, a circuitry group in which circuitry elements capable of generating the detection data are mounted. Meanwhile, in the present embodiment, the simply-described "detection data" includes both of pure raw data that is detected by the X-ray detector 12 and that is not yet subjected to pre-processing and raw data that is obtained by performing pre-processing on the pure raw data. Further, the data (detection data) that is not yet subjected to the pre-processing and the data that is subjected to the pre-processing may also collectively be referred to as projection data.

The table apparatus 30 is an apparatus on which the subject P to be subjected to scanning is placed and which moves the subject P, and includes a pedestal 31, a table driving apparatus 32, the tabletop 33, and a support frame 34. The pedestal 31 is a casing that supports the support frame 34 such that the support frame 34 is movable in a vertical direction. The table driving apparatus 32 is a motor or an actuator that moves the tabletop 33 on which the subject P is placed in a long axis direction of the tabletop 33. The tabletop 33 that is arranged on an upper surface of the support frame 34 is a plate on which the subject P is placed. Meanwhile, the table driving apparatus 32 may move the support frame 34 in the long axis direction of the tabletop 33, in addition to moving the tabletop 33.

The console apparatus 40 includes the memory 41, the display 42, the input interface 43, and processing circuitry 44. Data communication between the memory 41, the display 42, the input interface 43, and the processing circuitry 44 is performed via a bus, for example. Meanwhile, explanation will be given based on the assumption that the console apparatus 40 is separated from the gantry apparatus 10, but the console apparatus 40 or a part of the components of the console apparatus 40 may be included in the gantry apparatus 10.

The memory 41 is implemented by, for example, a semiconductor memory device, such as a RAM or a flash memory, a hard disk drive (HDD), an optical disk, a Solid State Drive (SSD), or the like. Further, the memory 41 may be a driving apparatus that reads and writes various kinds of information from and to a portable storage medium, such as a Compact Disc (CD), a Digital Versatile Disk (DVD), or a flash memory, a semiconductor memory apparatus, such as a RAM, or the like.

The memory 41 stores therein, for example, the detection data that is output from the DAS 18, the projection data that is generated by a preprocessing function 442, a reconstructed image that is reconstructed by a reconstruction processing function 444, an ROI that is set by a setting function 446, a three-dimensional histogram that is generated by a generation function 447, or the like. A storage region of the memory 41 may be provided in the PCCT apparatus 1 or in an external storage apparatus that is connected by a network.

The projection data or the detection data is data that is acquired by execution of photon counting CT on the subject P, and is, for example, a plurality of pieces of energy bin data corresponding to a plurality of energy bins or the like. For example, the projection data that is used as a basis of the reconstructed image may be referred to as scan data. The scan data is obtained by performing PCCT scan on the subject P. Specifically, the scan data is count data that is obtained by counting X-rays in accordance with a plurality of energies. The scan data is stored in the memory 41.

The reconstructed image is, for example, three-dimensional CT image data (volume data), two-dimensional CT image data, or the like. For example, the reconstructed image is a plurality of energy band images corresponding to a plurality of energy bins. Further, the memory 41 stores therein an image that is generated by normalizing and synthesizing the plurality of energy band images. This image is an integrated image in which pieces of count data of respective energies are integrated over the plurality of energy bins, and may be referred to as an Energy-Integrating Detector (EID) image. The EID image corresponds to an image with pixel values corresponding to CT values.

The three-dimensional histogram corresponds to, for example, a graph that represents a frequency of each pixel value with respect to the pixel values (for example, the CT values) of the plurality of energy band images and energies (for example, keV) of X-rays over the plurality of energy bins.

The memory 41 stores therein an imaging protocol including a scan condition. The scan condition is an imaging condition that is used in the PCCT scan performed by the PCCT apparatus 1. The scan condition includes, for example, tube voltage, a tube current, scan velocity, a total number of energy bins, an energy range of each of energies.

The imaging protocol includes, for example, a plurality of types of scan including the PCCT scan and a plurality of scan conditions corresponding to the plurality of types of scan. The plurality of types of scan include, for example, scanography for the subject P, imaging without a contrast agent (Non-CE), and/or imaging with a contrast agent (CE). In addition, the imaging protocol includes a plurality of reconstruction conditions corresponding to the plurality of types of scan. The reconstruction condition includes, for example, a reconstruction function, presence or absence of image processing, intensities of various kinds of filters related to image processing, presence or absence of an artifact reduction process, or the like. Meanwhile, it may be possible to set a plurality of reconstruction conditions for detection data (projection data group or the like) that is obtained by single multi-energy scan.

Meanwhile, the scan condition and the reconstruction condition may collectively be referred to as an image generation condition. Thus, the imaging protocol is generated in accordance with a CT examination that is performed on the subject P, for example. Therefore, the imaging protocol may be referred to as a scan plan corresponding to the subject P.

The memory 41 stores therein a program related to execution of each of a system control function 441, a preprocessing function 442, an acquisition function 443, a reconstruction processing function 444, an image processing function 445, a setting function 446, a generation function 447, and a management function 448 that are implemented by the processing circuitry 44. The memory 41 is one example of a storage unit.

The display 42 displays various kinds of information under the control of the processing circuitry 44. For example, the display 42 outputs a medical image (CT image) that is generated by the processing circuitry 44, a Graphical User Interface (GUI) for receiving various kinds of operation from the operator, or the like. Further, the display 42 displays an operation screen related to setting of various kinds of scan conditions. Furthermore, the display 42 displays various kinds of information calculated by the generation function 447. Various kinds of information generated by the generation function 447 will be described later.

As the display 42, for example, a Liquid Crystal Display (LCD), a Cathode Ray Tube (CRT) display, an Organic Electro Luminescence Display (OELD), a plasma display, or other arbitrary displays are appropriately applicable. Further, the display 42 may be arranged on the gantry apparatus 10. Furthermore, the display 42 may be of a desktop type or may be configured as a tablet terminal or the like that is able to perform wireless communication with a main body of the console apparatus 40. The display 42 is one example of a display unit.

The input interface 43 receives various kinds of input operation from the user, converts the received input operation to an electrical signal, and outputs the electrical signal to the processing circuitry 44. For example, the input interface 43 receives, from the user, the scan condition for collecting the projection data, the imaging protocol, the reconstruction condition for reconstructing the CT image data, an image processing condition related to post processing on the CT image data, or the like. The post processing may be performed by either the console apparatus 40 or an external workstation. Further, the post processing may be performed at the same time by both of the console apparatus 40 and the workstation.

The post processing defined herein is a concept that indicates processing on an image that is reconstructed by the reconstruction processing function 444. The post processing includes, for example, Multi Planer Reconstruction (MPR) display of the reconstructed image, rendering of volume data, or the like. As the input interface 43, for example, a mouse, a keyboard, a trackball, a switch, a button, a joystick, a touch pad, a touch panel display, or the like is appropriately applicable.

The input interface 43 inputs a position of a region of interest (ROI) in the medical image that is displayed by the display 42, in accordance with an instruction that is given by a user. Meanwhile, if three-dimensional volume data (for example, various kinds of rendering images or the like) is displayed as the medical image on the display 42, the input interface 43 may set a Volume of Interest (VOI) with respect to the three-dimensional volume data in accordance with an instruction that is given by the user. Furthermore, the input interface 43 inputs selection of various kinds of information that are generated based on the three-dimensional histogram, in accordance with an instruction that is given by the user.

Meanwhile, in the present embodiment, the input interface 43 is not limited to those including a physical operating part, such as a mouse, a keyboard, a trackball, a switch, a button, a joystick, a touch pad, a touch panel display, or the like. For example, examples of the input interface 43 include electrical signal processing circuitry that receives an electrical signal corresponding to input operation from an external input apparatus that is arranged separately from the subject apparatus and outputs the electrical signal to the processing circuitry 44. Further, the input interface 43 is one example of an input unit. Furthermore, the input interface 43 may be arranged on the gantry apparatus 10. Moreover, the input interface 43 may be configured as a tablet terminal or the like that is able to perform wireless communication with the main body of the console apparatus 40.

The processing circuitry 44 controls entire operation of the PCCT apparatus 1 in accordance with an electrical signal of input operation output from, for example, the input interface 43. For example, the processing circuitry 44 includes, as hardware resources, a processor, such as a CPU, an MPU, or a Graphics Processing Unit (GPU), and a memory, such as a ROM or a RAM. The processing circuitry 44 executes, by the processor that executes a program loaded on the memory of the processing circuitry 44, the system control function 441, the preprocessing function 442, the acquisition function 443, the reconstruction processing function 444, the image processing function 445, the setting function 446, the generation function 447, and the management function 448. Meanwhile, each of the functions 441 to 448 need not always be implemented by single processing circuitry, but the processing circuitry may be configured with a plurality of independent processors and each of the processors may execute each of the functions 441 to 448 by executing a program.

The system control function 441 controls each of the functions of the processing circuitry 44 based on input operation that is received from the user via the input interface 43. Further, the system control function 441 reads the control program that is stored in the memory 41, loads the control program onto the memory in the processing circuitry 44, and controls each of the units of the PCCT apparatus 1 in accordance with the loaded control program. The processing circuitry 44 that implements the system control function 441 is one example of a system control unit.

The preprocessing function 442 generates the projection data by performing pre-processing, such as a logarithmic transformation process, an offset correction process, a sensitivity correction process between channels, or beam hardening correction, on the detection data that is output from the DAS 18. Generation of the projection data is compliant with details of known processes, and therefore, explanation thereof will be omitted. The processing circuitry 44 that implements the preprocessing function 442 is one example of a pre-processing unit.

The acquisition function 443 acquires a plurality of pieces of energy bin data that are generated based on execution of photon counting CT (PCCT) scan. Specifically, the acquisition function 443 acquires the plurality of pieces of energy bin data corresponding to the plurality of energy bins based on the PCCT scan that is performed on the subject P. If the acquisition function 443 is mounted on the PCCT apparatus 1, the plurality of pieces of energy bin data are generated by, for example, the preprocessing function 442, so that it is possible to remove the acquisition function 443 from among the functions of the processing circuitry 44. In contrast, if the processing circuitry 440 including the acquisition function 443 is mounted on the medical image processing apparatus 400, the acquisition function 443 acquires the plurality of pieces of energy bin data from the PCCT apparatus 100. The acquisition function 443 stores the plurality of pieces of acquired energy bin data in the memory 41. The processing circuitry 44 that implements the acquisition function 443 is one example of an acquisition unit.

The reconstruction processing function 444 performs, based on the reconstruction condition, a reconstruction process using a Filtered Back Projection (FBP) method on the projection data that is generated by the preprocessing function 442, and generates the CT image data. The reconstruction process includes various kinds of processes, such as correction processes including scattering correction and beam hardening correction, and application of a reconstruction function in the reconstruction condition. Meanwhile, the reconstruction process performed by the reconstruction processing function 444 is not limited to the FBP method, but it may be possible to appropriately use a known process, such as iterative approximation reconstruction or a deep neural network that outputs a reconstructed image upon input of the projection data. The reconstruction processing function 444 stores the reconstructed CT image data in the memory 41. The processing circuitry 44 that implements the reconstruction processing function 444 is one example of a reconstruction processing unit.

For example, the reconstruction processing function 444 reconstructs a plurality of energy band images corresponding to the plurality of energy bins based on the plurality of pieces of energy bin data. Each of the energy band images may be referred to as an energy bin image or a photon Counting Detector (PCD) image. Meanwhile, each of the energy band images may have values, as the pixel values, corresponding to the CT values by a predetermined normalization. The predetermined normalization corresponds to, for example, an averaging process with calibration correction for converting the pixel values in each of the energy band images to values corresponding to the CT values on the basis of CT values of a reference material, such as water.

Further, the reconstruction process implemented by the reconstruction processing function 444 is not limited to generation of an image based on pre-reconstruction data, such as the projection data (the plurality of pieces of energy bin data), but may include a function of implementing a reconstruction process in a broad sense. This image corresponds to a PCCT-specific image that is generated based on the plurality of pieces of energy bin data or the plurality of energy band images. For example, the reconstruction processing function 444 generates a PCCT-specific image, such as a reference material image, a virtual monochromatic X-ray image, a Virtual Non-Contrast (VNC) image, an iodine map image, an effective atomic number image, an electron density image, or a plurality of energy images, based on the pre-reconstruction data and in accordance with the reconstruction condition.

The reference material image is an image related to a reference material. The reference material is, for example, water, iodine, or the like. In this case, the reference material image is, for example, a water image in which water content (for example, a water existence ratio or the like) is represented for each pixel, an iodine image in which iodine content (for example, an iodine existence ratio or the like) is represented for each pixel. The virtual monochromatic X-ray image corresponds to monochromatic X-ray that has a single specific energy component (keV) at energy of an X-ray (for example, white X-ray) generated by the X-ray tube 11. The virtual monochromatic X-ray image corresponds to a medical image that may be obtained by virtually capturing an image with a specific monochrome X-ray.

The VNC image is generated by, for example, a contrasted image. The iodine map image is a medical image that indicates a degree of dyeing of a contrast agent that includes iodine as a component. The effective atomic number image is, for example, a medical image that indicates a type of an element if each of the voxels is composed of a single element, with respect to a type of an element of each of the voxels. Further, if each of the voxels is composed of a plurality of elements, the effective atomic number image is a medical image that indicates an average atomic number. That is, the effective atomic number is an atomic number of a corresponding atom based on the assumption that a certain voxel is replaced with a single atom. For example, the effective atomic number image corresponds to an image that corresponds to a characteristic X-ray (k-edge) among X-rays that are generated by the X-ray tube 11.

The electron density image is a medical image that represents the number of electrons that are estimated to exist in a unit volume. The electron density image corresponds to, for example, a medical image that represents density of the contrast agent. Each of energy images corresponds to a medical image that is generated based on detection data that is corrected for each of the energy bins in the PCCT apparatus 1. As for reconstruction of generating a medical image by the reconstruction processing function 444, known processing details are appropriately applicable, and therefore explanation thereof will be omitted.

The image processing function 445 converts the CT image data that is generated by the reconstruction processing function 444 to tomographic image data or three-dimensional image data of an arbitrary cross section by a known method based on input operation that is received from the user via the input interface 43. The tomographic image data of an arbitrary cross section is, for example, a plurality of multi planar reconstruction (MPR) images, a curved planer reconstruction image, or the like. Meanwhile, the three-dimensional image data may be directly generated by the reconstruction processing function 444. Further, as for various kinds of image processing performed by the image processing function 445, known processes are applicable, and therefore, explanation thereof will be omitted. The processing circuitry 44 that implements the image processing function 445 is one example of an image processing unit.

Furthermore, the image processing function 445 generates an energy integrated image corresponding to all of energies that are integrated over a plurality of energy bins, based on the plurality of energy band images. For example, the image processing function 445 generates an energy integrated image or three-dimensional volume data corresponding to all of the energies by performing a predetermined normalization on the plurality of energy band images and synthesizing the plurality of energy band images. The energy integrated image has certain values, as the pixel values, that correspond to the CT values. Moreover, the generated three-dimensional volume data has certain values, as voxel values, that correspond to the CT values.

Figure 3:
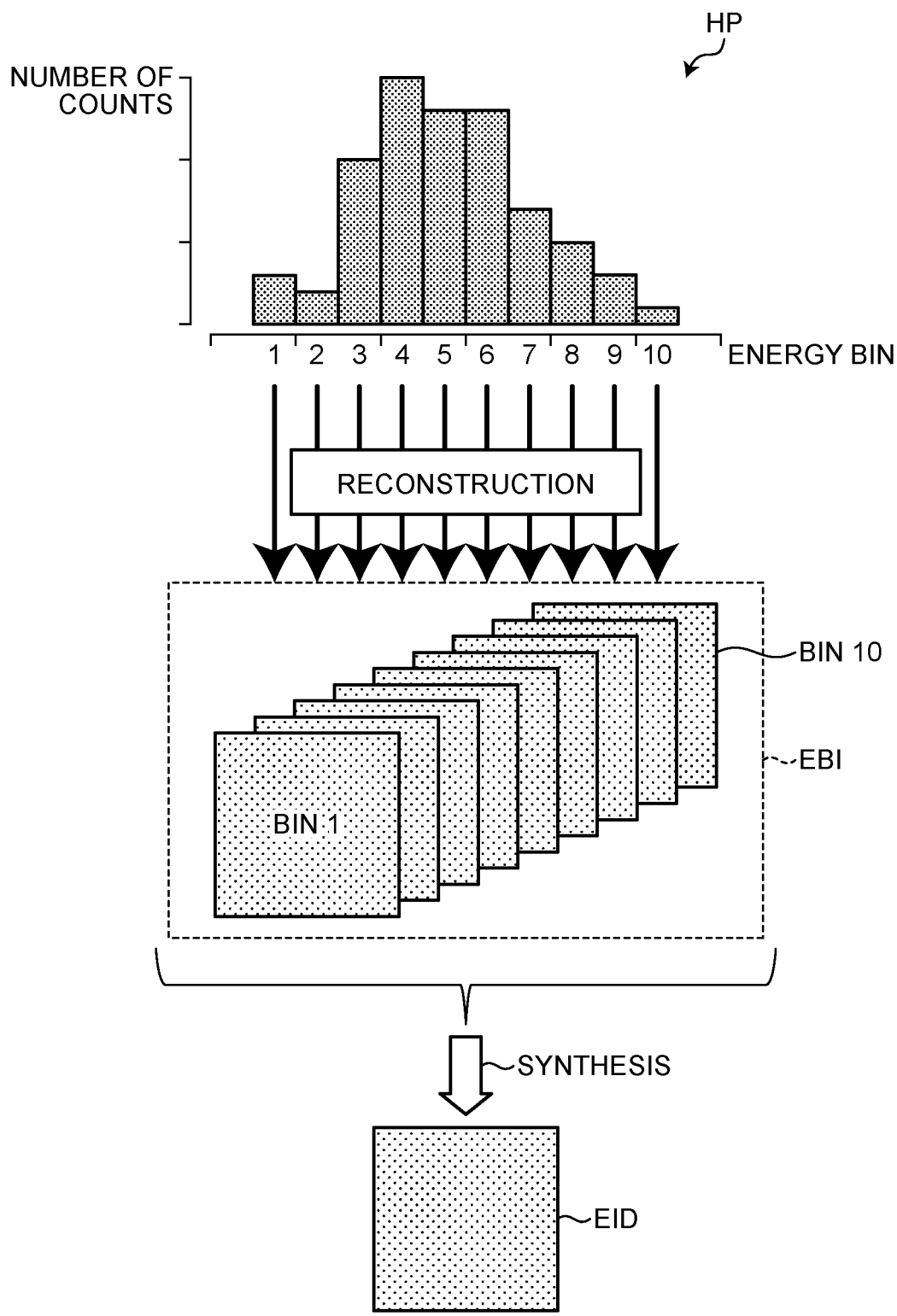
FIG. 3 is a diagram illustrating an example of overview of generation of a plurality of energy band images and generation of an energy integrated image according to one embodiment.

FIG. 3 is a diagram illustrating an example of overview of generation of a plurality of energy band images EBI and generation of the energy integrated image EID. A histogram HP illustrated in FIG. 3 represents an example of count data over a plurality of energy bins at a certain view number and a certain channel number. In FIG. 3, the total number of energy bins is described as 10, but the number of bins is not limited to this example, and may be set appropriately at the time of setting the scan condition or the imaging protocol. The plurality of energy band images EBI are generated by, as illustrated in FIG. 3, performing reconstruction for each of the energy bins with respect to count data (each piece of energy bin data) over all of the view numbers and all of the channel numbers.

As illustrated in FIG. 3, the image processing function 445 generates the energy integrated image EID by normalizing and synthesizing the plurality of energy band images EBI. Meanwhile, if calibration correction is performed at the time of reconstruction of the plurality of energy band images EBI, an additive average is used when the energy integrated image EID is generated from the plurality of energy band images EBI, for example.

The setting function 446 sets, based on a position of the ROI that is set in the energy integrated image EID, a region of interest at the same position as the set ROI in each of the energy band images. For example, if the ROI is set in the energy integrated image EID displayed on the display 42 in accordance with an instruction that is given by the user via the input interface 43, the setting function 446 identifies the position of the ROI (hereinafter, referred to as a reference ROI) in the energy integrated image EID. Subsequently, the setting function 446 sets, at the identified position, an ROI (hereinafter, referred to as a set ROI) with the same size and the same shape as the reference ROI in each of the energy band images. The processing circuitry 44 that implements the setting function 446 is one example of a setting unit.

The generation function 447 generates, based on the plurality of energy band images EBI, a three-dimensional histogram that is based on a plurality of pixel values and a plurality of energy bands (a plurality of energy bins) that are included in the plurality of energy band images EBI,. For example, the generation function 447 generates a three-dimensional histogram of pixel values related to the ROI, on the basis of pixel values of the ROIs (the ROIs that are set by the setting function 446) in the plurality of energy band images EBI. Specifically, the generation function 447 generates the three-dimensional histogram by assigning the pixel value to the X axis, the frequency to the Z axis, and the energy bin to the Y axis (arranges energy bins). Meanwhile, an item that is assigned to each of the axes in the three-dimensional histogram is not limited to the above, and may be set arbitrarily. The processing circuitry 44 that implements the generation function 447 is one example of a generation unit.

Figure 4:
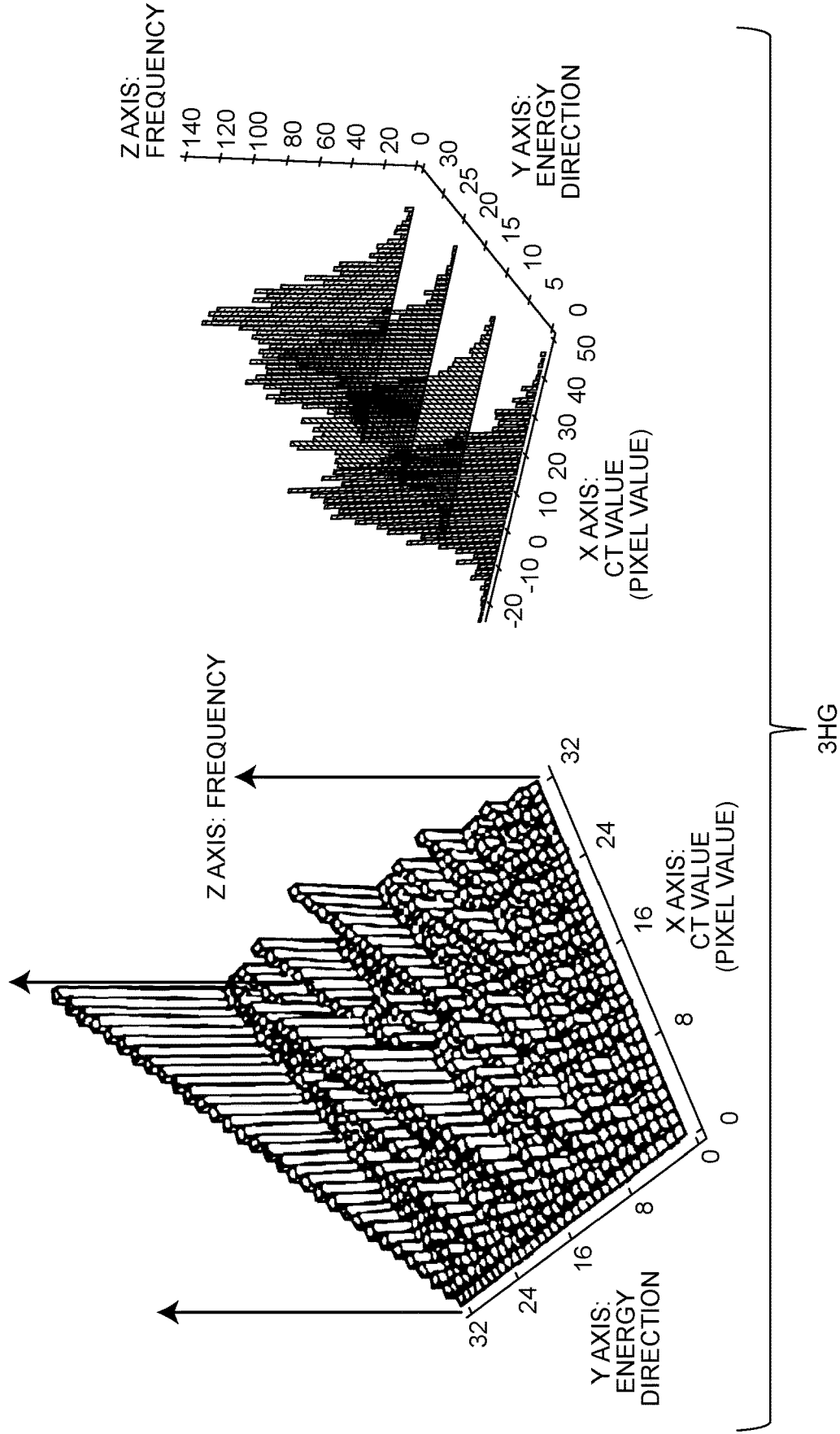
FIG. 4 is a diagram illustrating an example of a three-dimensional histogram according to one embodiment.

FIG. 4 is a diagram illustrating an example of three-dimensional histograms 3HG. As illustrated in FIG. 4, in the three-dimensional histogram on the left side, a vertical axis represents an energy (keV) direction, a horizontal axis represents the CT value (pixel value), and a height direction represents s a frequency. Further, as illustrated in FIG. 4, in the three-dimensional histogram on the right side, a vertical axis represents the CT value (pixel value), a horizontal axis represents the energy (keV) direction, and a height direction represents the frequency. In the three-dimensional histograms 3HG, the number of divisions in the energy direction corresponds to the number of energy bins. For example, as illustrated in FIG. 4, in the three-dimensional histogram on the left side, the number of energy bins is 32. In contrast, as illustrated in FIG. 4, in the three-dimensional histogram on the right side, the number of energy bins is 4.

The generation function 447 further generates information that is based on the three-dimensional histogram. Specifically, the generation function 447 generates, as the information as described above, a two-dimensional histogram that corresponds to a specific cross section of the subject P and that indicates energies of X-rays over the plurality of energy bins and frequencies of the pixel values of the plurality of energy band images, in accordance with an instruction that is given by the user via the input interface 43. The specific cross section of the subject P corresponds to, for example, a cross section of the energy integrated image EID in which the ROI is set.

The two-dimensional histogram described above is, for example, a histogram of an YZ cross section (horizontal axis: energy, vertical axis: frequency) with respect to the CT values (pixel values) that are set by the user via the input interface 43 in the three-dimensional histogram. Further, the two-dimensional histogram described above may be, for example, a histogram of an XZ cross section (horizontal axis: the CT value, the vertical axis: frequency) with respect to the energy bins that are set by the user via the input interface 43 in the three-dimensional histogram. More typically, the two-dimensional histogram that is generated by the generation function 447 may be a histogram of an arbitrary cross section in the three-dimensional histogram 3HG.

The management function 448 manages the three-dimensional histogram 3HG in association with the energy integrated image EID, by using header information on chronological data related to the energy integrated image EID or header information on the plurality of pieces of energy bin data. For example, the management function 448 manages the two-dimensional histogram in association with the energy integrated image EID by using the header information on the chronological data on the energy integrated image EID or the header information on the plurality of pieces of energy bin data. With this configuration, the three-dimensional histogram 3HG and the two-dimensional histogram are stored in the memory 41 in association with the energy integrated image EID. The processing circuitry 44 that implements the management function 448 corresponds to a management unit.

Figure 5:
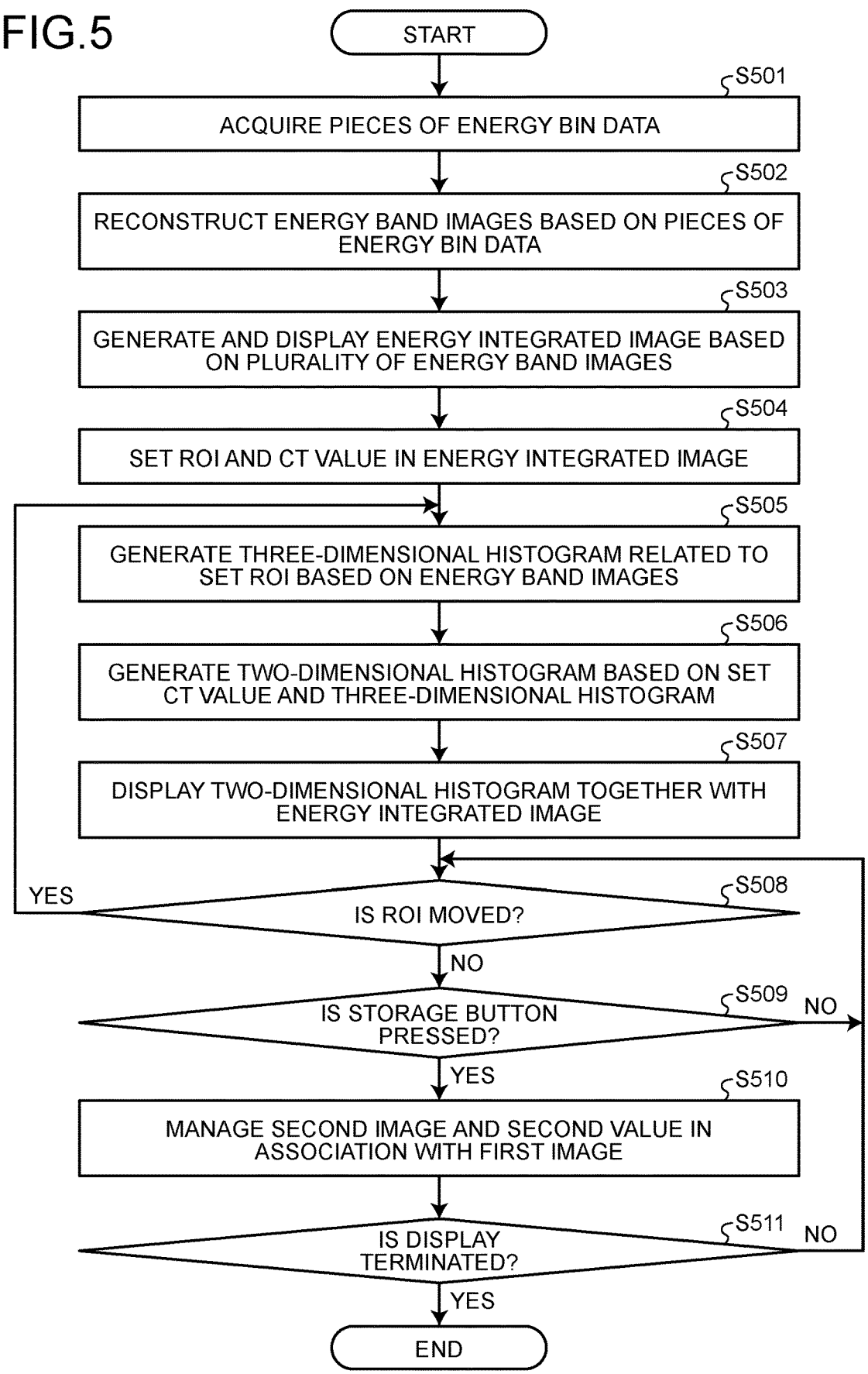
FIG. 5 is a flowchart illustrating an example of the flow of medical image processing according to one embodiment.

Medical image processing that is implemented by the PCCT apparatus 1 according to the present embodiment configured as described above will be described below with reference to FIG. 5 to FIG. 9. FIG. 5 is a flowchart illustrating an example of the flow of the medical image processing.

Medical Image Processing

Step S501

The processing circuitry 44 acquires, by the acquisition function 443, the plurality of pieces of energy bin data that are generated based on execution of the PCCT scan. The acquisition function 443 stores the plurality of pieces of acquired energy bin data in the memory 41.

Step S502

The processing circuitry 44 reconstructs, by the reconstruction processing function 444, the plurality of energy band images EBI based on the plurality of pieces of energy bin data. That is, each of the energy band images EBI is reconstructed from each piece of energy bin data in accordance with each of the energy bins as illustrated in FIG. 3. The reconstruction processing function 444 stores the plurality of reconstructed energy band images EBI in the memory 41.

Step S503

The processing circuitry 44 generates, by the image processing function 445, the energy integrated image EID corresponding to all of energies that are integrated over the plurality of energy bins, based on the plurality of energy band images EBI. The energy integrated image EID is generated from, as illustrated in FIG. 3, the plurality of energy band images EBI. The image processing function 445 displays the generated energy integrated image EID together with a designation screen for designating the ROI on the display 42.

Step S504

The processing circuitry 44 sets, by the setting function 446, an ROI with respect to the energy integrated image EID displayed on the display 42, in accordance with an instruction that is given by the user via the input interface 43. Further, the ROI is set in the energy integrated image EID that is displayed on the display 42, in accordance with an instruction that is given by the user via the input interface 43.

In this case, it may be possible to set a CT value related to generation of the two-dimensional histogram in accordance with an instruction that is given by the user via the input interface 43. Meanwhile, as for input of the CT value, it is possible to input the CT value at an arbitrary timing before Step S506.

Figure 6:
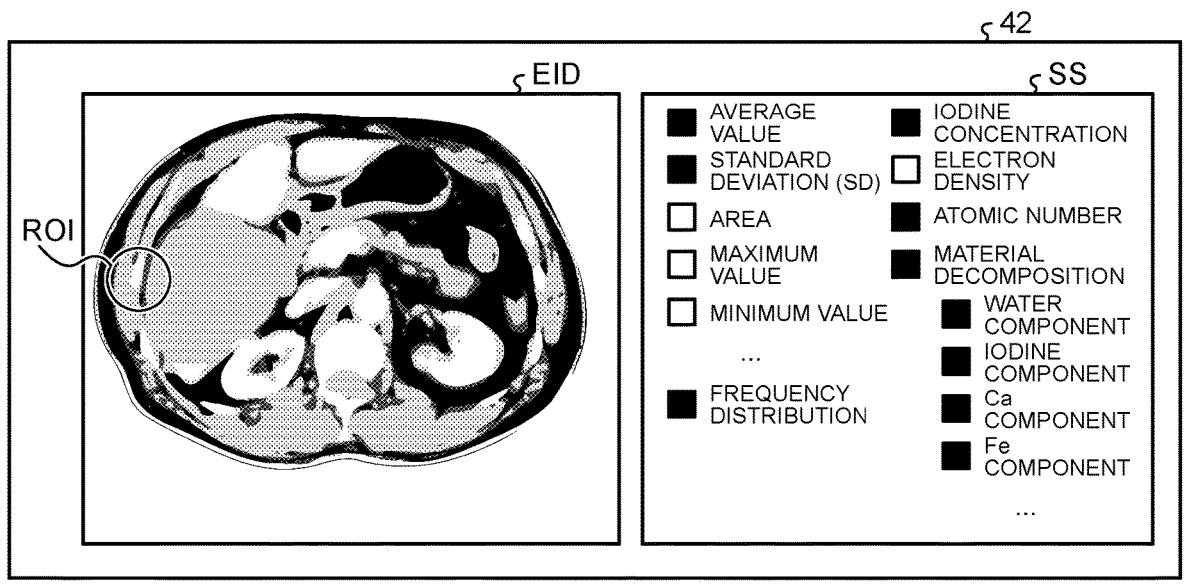
FIG. 6 is a diagram illustrating an example of an energy integrated image that is displayed on the display, a region of interest that is set in the energy integrated image, and a designation screen according to one embodiment.

FIG. 6 is a diagram illustrating an example of the energy integrated image EID that is displayed on the display 42, the ROI that is set in the energy integrated image EID, and a designation screen SS. As illustrated in FIG. 6, the ROI is illustrated as a circle, but the shape of the ROI is not limited to a circle, and may be set arbitrarily. Further, it may be possible to display, on the display 42, volume data, such as various kinds of rendering image, instead of the energy integrated image EID. In this case, the setting function 446 sets a volume of interest (VOI) in the volume data in accordance with an instruction that is given by the user via the input interface 43.

As illustrated in FIG. 6, check boxes for selecting an analysis item in the ROI that is set in the energy integrated image EID are displayed on the designation screen SS. Examples of the analysis item include an average value of CT values based on a plurality of CT values in the ROI, a standard deviation based on the plurality of CT values in the ROI, a maximum value of the CT values in the ROI, a minimum value of the CT values in the ROI, a frequency distribution (histogram) related to a plurality of pixels values (CT values) in the ROI, iodine concentration, electron density, an atomic number, and a result of material decomposition.

In FIG. 6, the average value, the standard deviation (SD), the frequency distribution, the iodine concentration, the atomic number, and a water component, an iodine component, a Ca component, and a Fe component in material decomposition are checked. After this step, analysis values corresponding to the checked analysis items are calculated by a calculation function (not illustrated) of the processing circuitry 44 on the basis of the plurality of pieces of energy bin data or the plurality of energy band images EBI. For example, the calculation function calculates analysis values corresponding to the checked items in the designation screen SS, on the basis of the PCCT-specific image. As for details of processes for calculating the analysis values, known methods are appropriately applicable, and therefore, explanation thereof will be omitted.

Step S505

The processing circuitry 44 generates, by the generation function 447, the three-dimensional histogram 3HG related to the set ROI on the basis of the plurality of energy band images EBI related to the set ROI. The generation function 447 temporarily stores the generated three-dimensional histogram 3HG in the memory 41, for example. Meanwhile, the generated three-dimensional histogram 3HG may be displayed on the display 42 together with the energy integrated image EID in which the ROI is set.

Step S506

The processing circuitry 44 generates, by the generation function 447, the two-dimensional histogram based on the CT value that is set (hereinafter, referred to as a set CT value) and the three-dimensional histogram. The generation function 447 temporarily stores the generated two-dimensional histogram in the memory 41.

Step S507

The processing circuitry 44 displays, by the system control function 441 or a display control function (not illustrated), the energy integrated image EID in which the ROI is set and the two-dimensional histogram on the display 42.

In this case, it may be possible to display a position of the two-dimensional histogram in the three-dimensional histogram 3HG, that is, a position of a cross section corresponding to the two-dimensional histogram with respect to the three-dimensional histogram 3HG, on the display 42.

Figure 7:
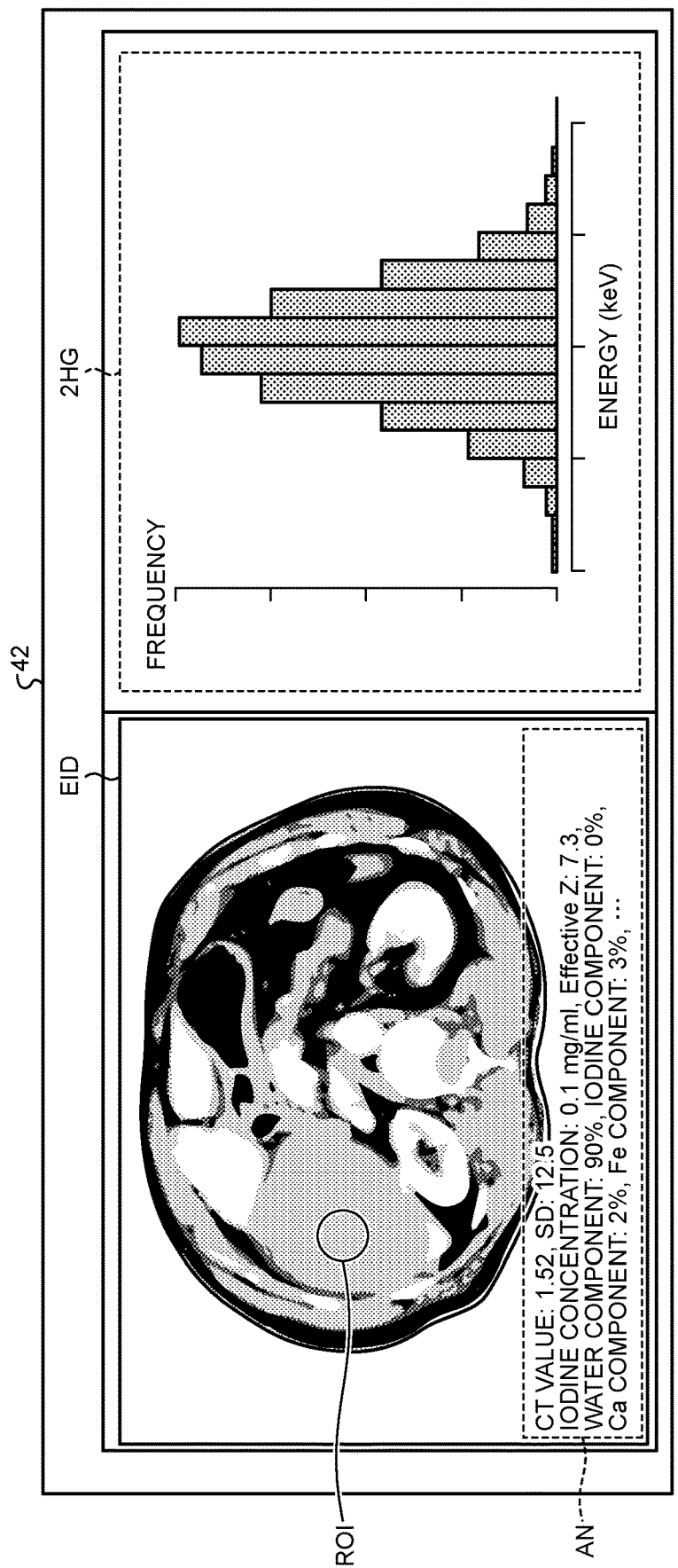
FIG. 7 is a diagram illustrating an example of the energy integrated image in which the region of interest is set and a two-dimensional histogram related to a set CT value according to one embodiment.

FIG. 7 is a diagram illustrating an example of the energy integrated image EID in which the ROI is set and a two-dimensional histogram 2HG related to the set CT value. As illustrated in FIG. 7, the energy integrated image EID in which the ROI is set and the two-dimensional histogram 2HG related to the set CT value are displayed on the display 42. Further, analysis values AN corresponding to the analysis items that are checked in the designation screen SS illustrated in FIG. 6 are displayed on the display 42.

Step S508

If the ROI in the energy integrated image EID is moved in accordance with an instruction that is given by the user via the input interface 43 (Yes at Step S508), the processes from Step S505 are repeated. Meanwhile, if setting of the CT value or the like is changed, the processes from Step S504 are repeated. If the ROI in the energy integrated image EID is not moved (No at Step S508), a process at Step S509 is performed.

Figure 8:
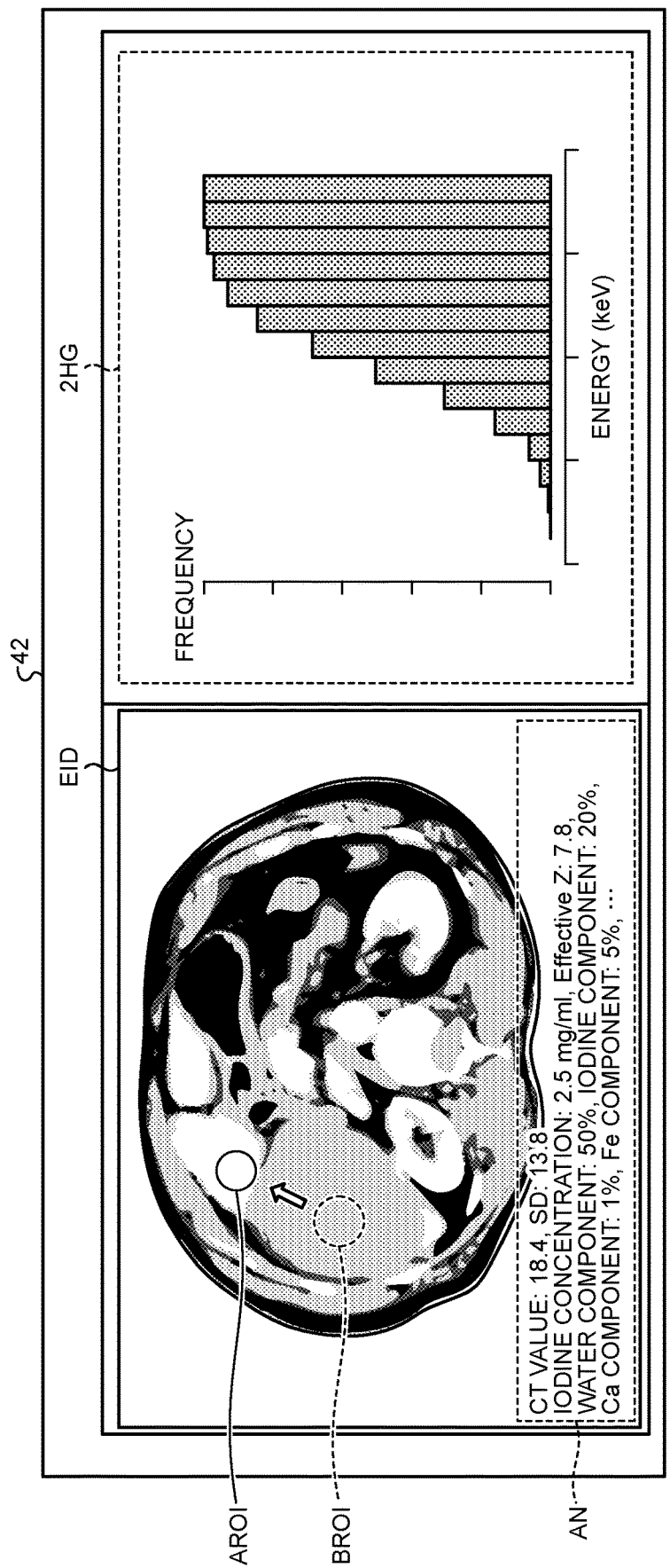
FIG. 8 is a diagram illustrating an example in which a region of interest is moved in the energy integrated image according to one embodiment.

FIG. 8 is a diagram illustrating an example in which the ROI is moved in the energy integrated image EID. In FIG. 8, AROI represents a moved ROI and BROI represents an ROI that is not yet moved. As illustrated in FIG. 8, if the ROI is moved, the analysis values are calculated in accordance with a position of the moved ROI, and a new two-dimensional histogram is generated. The calculated analysis values AN and the generated two-dimensional histogram 2HG are displayed on the display 42.

Figure 9:
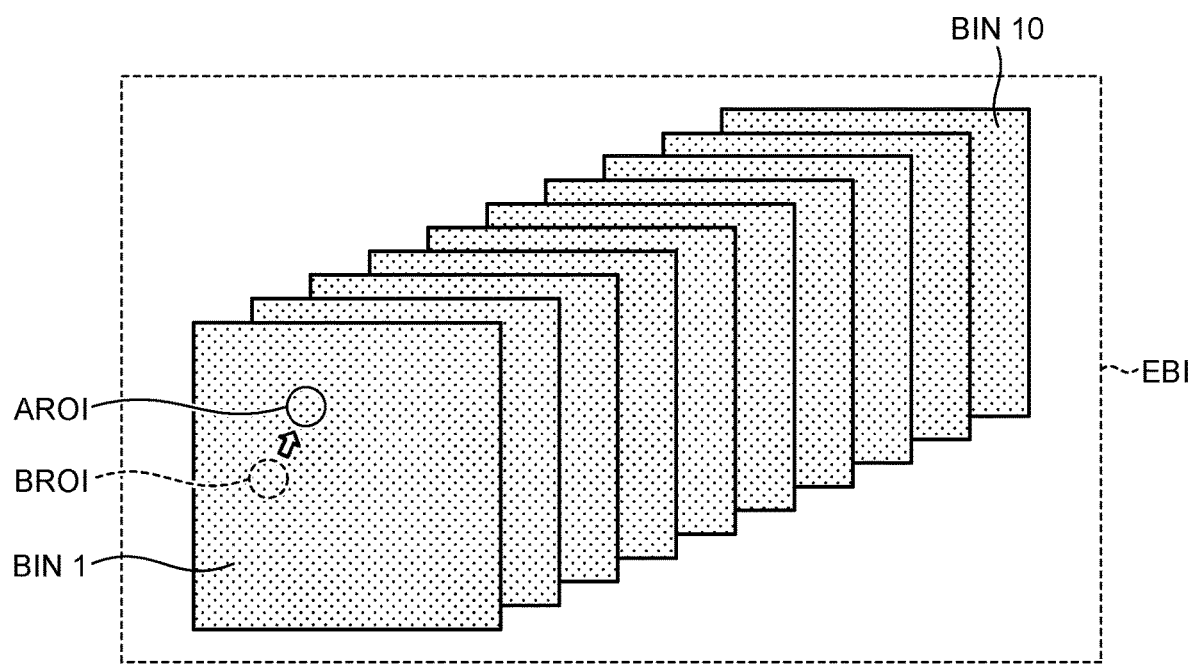
FIG. 9 is a diagram illustrating setting of a region of interest before and after movement of the region of interest in a plurality of energy band images according to one embodiment.

FIG. 9 is a diagram illustrating an example of setting of the ROI before and after the ROI is moved in the plurality of energy band images EBI. As illustrated in FIG. 9, if the ROI is moved in the energy integrated image EID, the setting function 446 moves the ROI (BROI) that is not yet moved in the plurality of energy band images EBI to the position of the moved ROI (AROI). In the moved ROI (AROI), calculation of the analysis values and generation of the two-dimensional histogram 2HG are performed.

Step S509

If a storage button is pressed in accordance with an instruction that is given by the user via the input interface 43 (Yes at Step S509), a process at Step S510 is performed. If the storage button is not pressed in accordance with an instruction that is given by the user via the input interface 43 (No at Step S509), the process at Step S508 is performed.

Step S510

The processing circuitry 44 manages, by the management function 448, the two-dimensional histogram 2HG and the analysis values AN that are displayed on the display 42, in association with the energy integrated image EID. For example, if the energy integrated image EID is managed in the form of Digital Imaging and Communications in Medicine (DICOM), the management function 448 manages the two-dimensional histogram 2HG in association with the energy integrated image EID, by using the header information on the chronological data related to the energy integrated image EID. Further, the management function 448 may manage the two-dimensional histogram 2HG and the analysis values AN in association with the energy integrated image EID, by using a private tag of DICOM.

Furthermore, for example, if header information on the plurality of pieces of energy bin data is generated as a new tag in header information on DICOM, the management function 448 manages the two-dimensional histogram 2HG and the analysis values AN in association with the energy integrated image EID by using the header information on the plurality of pieces of energy bin data. With this configuration, the two-dimensional histogram 2HG and the analysis values AN are stored in the memory 41 in association with the energy integrated image EID. That is, by the management function 448, it is possible to appropriately associate the two-dimensional histogram 2HG and the analysis values AN with the energy integrated image EID.

Step S511

If display of the energy integrated image EID, the analysis values AN, and the two-dimensional histogram 2HG is terminated in accordance with an instruction that is given by the user via the input interface 43 (Yes at Step S511), the medical image processing is terminated. If display of the energy integrated image EID, the analysis values AN, and the two-dimensional histogram 2HG is not terminated in accordance with an instruction that is given by the user via the input interface 43 (No at Step S511), the process at Step S508 is repeated.

The medical image processing apparatus 400 according to one embodiment as described above performs PCCT scan on the subject P, acquires a plurality of pieces of energy bin data corresponding to a plurality of energy bins, reconstructs the plurality of energy band images EBI corresponding to the plurality of energy bins on the basis of the plurality of pieces of energy bin data, and generates the three-dimensional histogram 3HG that represents the pixel values of the plurality of energy band images EBI, energies of X-rays over the plurality of energy bins, and frequencies of the pixel values on the basis of the plurality of energy band images EBI.

For example, the medical image processing apparatus 400 according to one embodiment generates the energy integrated image EID based on the plurality of energy band images EBI, sets an ROI at the same position as the position of the ROI in each of the energy band images EBI based on the position of the ROI that is set in the energy integrated image EID, and generates the three-dimensional histogram 3HG related to the ROI on the basis of the pixel values in the ROIs that are set in the plurality of energy band images EBI.

Furthermore, the medical image processing apparatus 400 according to one embodiment further generates information that is based on the three-dimensional histogram 3HG, and displays the generated information. For example, the medical image processing apparatus 400 according to one embodiment generates, as the information, the two-dimensional histogram 2HG that corresponds to a specific cross section of the subject P and that indicates energies of X-rays over the plurality of energy bins and frequencies of the pixel values of the plurality of energy band images EBI, and displays the generated two-dimensional histogram 2HG on the display 42.

Moreover, the medical image processing apparatus 400 according to one embodiment manages the three-dimensional histogram 3HG in association with the energy integrated image EID by using the header information on the chronological data related to the energy integrated image EID or the header information on the plurality of pieces of energy bin data. For example, the medical image processing apparatus 400 according to one embodiment manages the two-dimensional histogram 2HG in association with the energy integrated image EID by using the header information on the chronological data related to the energy integrated image EID or the header information on the plurality of pieces of energy bin data. With this configuration, according to the medical image processing apparatus 400 of one embodiment, it is possible to store the generated three-dimensional histogram 3HG and/or the two-dimensional histogram 2HG in the memory 41 in association with the energy integrated image EID.

In view of the above, according to the medical image processing apparatus 400 of the present embodiment, it is possible to generate and display the two-dimensional histogram 2HG on the display 42 in accordance with setting of the ROI (for example, movement of the ROI) without newly activating application software related to calculation of the analysis values and generation of the two-dimensional histogram 2HG related to the plurality of energy band images EBI, that is, without displaying an analysis screen related to the plurality of energy band images EBI. Therefore, according to the medical image processing apparatus 400 of the present embodiment, in the ROI, it is possible to improve operation performance in relation to generation, display, and management of energy information (for example, the two-dimensional histogram 2HG) that is specific to scan that is able to distinguish a plurality of energies.

Thus, according to the medical image processing apparatus 400 of the present embodiment, analysis is performed a number of times by the PCCT scan and it is possible to display values of various analysis results on the display 42 although it is conventionally normal to display a single analysis result together with a medical image and display only a calculation value of an ROI with respect to the subject image. Thus, according to the medical image processing apparatus 400 of the present embodiment, it is possible to improve throughput of diagnosis on the subject P and improve efficiency of setting of a treatment plan.

First Application Example

In this application example, abundance ratios of a plurality of materials in a cross section of the subject P related to the three-dimensional histogram 3HG are generated based on the three-dimensional histogram 3HG, and are displayed on the display 42. The cross section of the subject P related to the three-dimensional histogram 3HG corresponds to the energy integrated image EID in which the ROI is set. Further, the abundance ratios of the plurality of materials indicate existence ratios of the plurality of materials in the ROI that is set in the energy integrated image EID. Generation of the abundance ratios of the plurality of materials corresponds to estimation of a plurality of abundance ratios (content ratios of a plurality of materials in the ROI) corresponding to respective materials in the ROI.

The processing circuitry 44 generates, by the generation function 447, the abundance ratios of the plurality of materials in the cross section of the subject P on the basis of the three-dimensional histogram 3HG. Specifically, the generation function 447 generates a plurality of abundance ratios corresponding to respective materials in the ROI that is set in the cross section, that is, the ROI that is set in the energy integrated image EID related to the three-dimensional histogram 3HG by using a trained model that outputs the abundance ratios upon input of the three-dimensional histogram 3HG.

The trained model is trained in advance so as to correspond to a plurality of known materials, adopt, as input, a combination of pixel values of a plurality of energy band images corresponding to a plurality of pieces of energy bin data, energies of X-rays over the plurality of energy bins, and a plurality of three-dimensional histograms that represent frequencies of the pixel values, and adopt output as combined information. Training data used for training the trained model is generated by, for example, the following procedure.

First, a plurality of three-dimensional frequency distributions corresponding to respective materials are acquired by numerical simulation and/or actual measurement. Subsequently, a plurality of synthesized frequency distributions corresponding to a plurality of combination ratios are generated by synthesizing a plurality of three-dimensional frequency distributions in accordance with combination ratios of the plurality of materials. With this configuration, each of the combination ratios and each of the synthesized frequency distributions have one-to-one correspondence. That is, training data at the time of training of a training target model (for example, a neural network) includes a plurality of synthesized frequency distributions and the combination ratios (correct answer data) corresponding to the plurality of synthesized frequency distributions.

The trained model is generated by training the training target model by using the training data. As for training on the training target model, a known method is applicable, and therefore, explanation thereof will be omitted. The generated trained model is stored in the memory 41. The generation function 447 reads the trained model from the memory 41. The generation function 447 inputs the three-dimensional histogram 3HG to the read trained model and generates the abundance ratios (content rates) of the plurality of materials in the ROI. The generated abundance ratios are displayed on the display 42 together with the two-dimensional histogram 2HG.

Meanwhile, the trained model described above is explained that the three-dimensional histogram 3HG is used as input, but the trained model is not limited to this example. For example, input of the trained model may be the two-dimensional histogram 2HG. In this case, the trained model (hereinafter, referred to as a 2D trained model) is trained a plurality of number of times in accordance with the CT values and stored in the memory 41. That is, the 2D trained model is generated by training using training data that includes a plurality of synthesized frequency distributions for the respective CT values and combination ratios (correct answer data) corresponding to the respective synthesized frequency distributions. Meanwhile, the trained model that adopts the three-dimensional histogram 3HG as input and the 2D trained model may be trained in accordance with a size (an area or the like) of the ROI.

Figure 10:
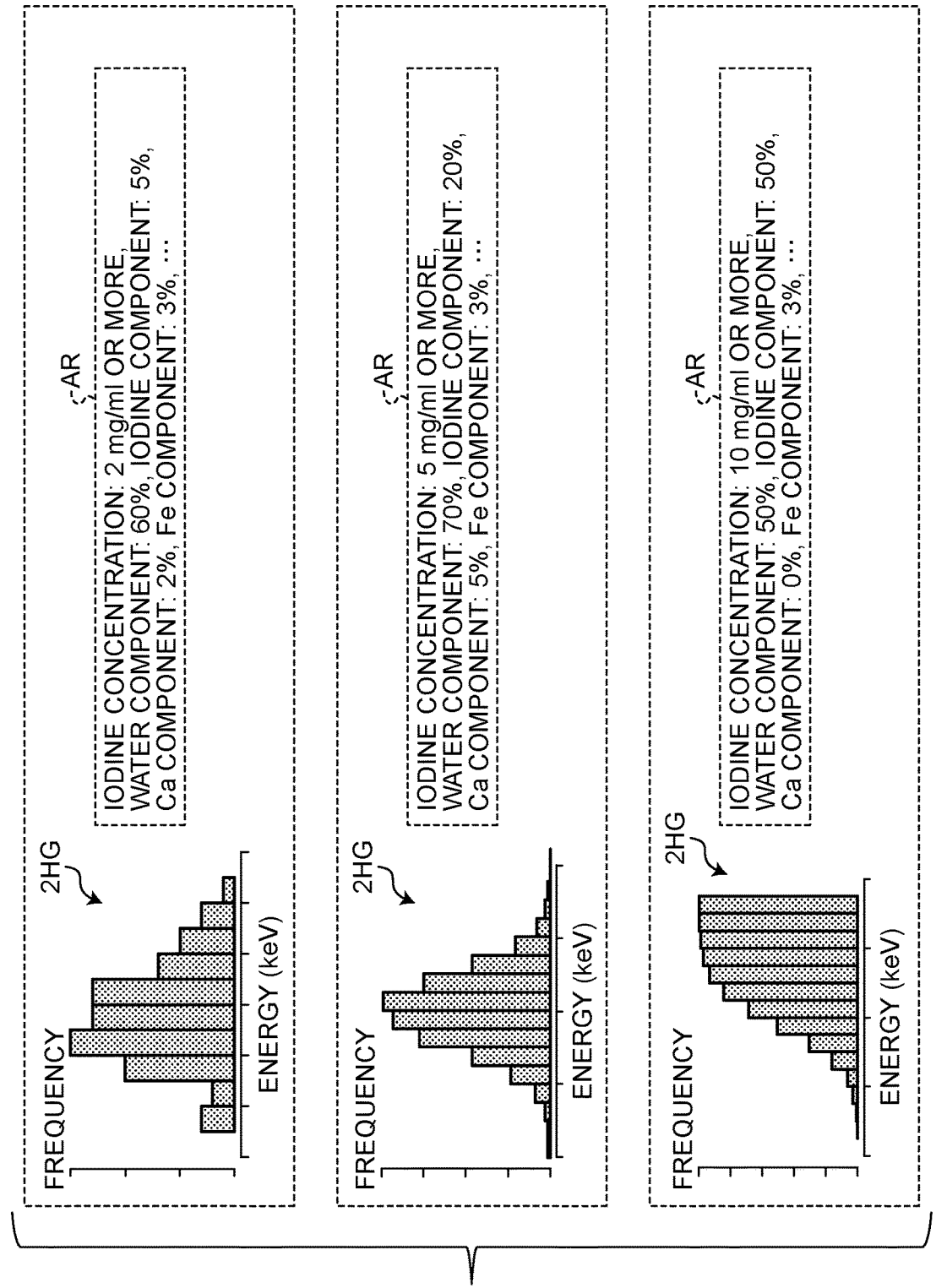
FIG. 10 is a diagram illustrating an example of abundance ratios that are displayed together with two-dimensional frequency distributions according to a first application example of one embodiment.

FIG. 10 is a diagram illustrating examples of abundance ratios AR that are displayed with two-dimensional frequency distributions 2HG. As illustrated in FIG. 10, the abundance ratios AR are displayed on the display 42 together with the two-dimensional frequency distribution 2HG. Meanwhile, the abundance ratios AR may be displayed on the display 42 instead of the analysis values AN.

The medical image processing apparatus 400 according to the present application example generates the abundance ratios of the plurality of materials in a cross section of the subject P related to the three-dimensional histogram 3HG on the basis of the three-dimensional histogram 3HG. For example, the medical image processing apparatus 400 according to the present application example generates the abundance ratios in the ROI that is set in the cross section by using the trained model that outputs the abundance ratios upon input of the three-dimensional histogram 3HG. The trained model in the medical image processing apparatus 400 according to the present application example is trained in advance so as to correspond to a plurality of known substances, adopt, as input, a combination of pixel values of a plurality of energy band images corresponding to a plurality of pieces of energy bin data, energies of X-rays over the plurality of energy bins, and a plurality of three-dimensional histograms that represent frequencies of the pixel values, and adopt output as combined information.

According to the medical image processing apparatus 400 of the present application example, it is possible to generate and display the abundance ratios of the plurality of materials, that is, material component ratios (also referred to as percentage ratios) in the set ROI based on the three-dimensional histogram 3HG or the two-dimensional histogram 2HG and the trained model. In particular, if the trained model that adopts the three-dimensional histogram 3HG as input is used, it is possible to provide a material component ratio with higher likelihood (and S/N or the like) as compared to the 2D trained model to the user. With this configuration, according to the medical image processing apparatus 400 of the present application example, it is possible to improve throughput of diagnosis on the subject P and improve efficiency of setting of a treatment plan.

Second Application Example

Figure 11:
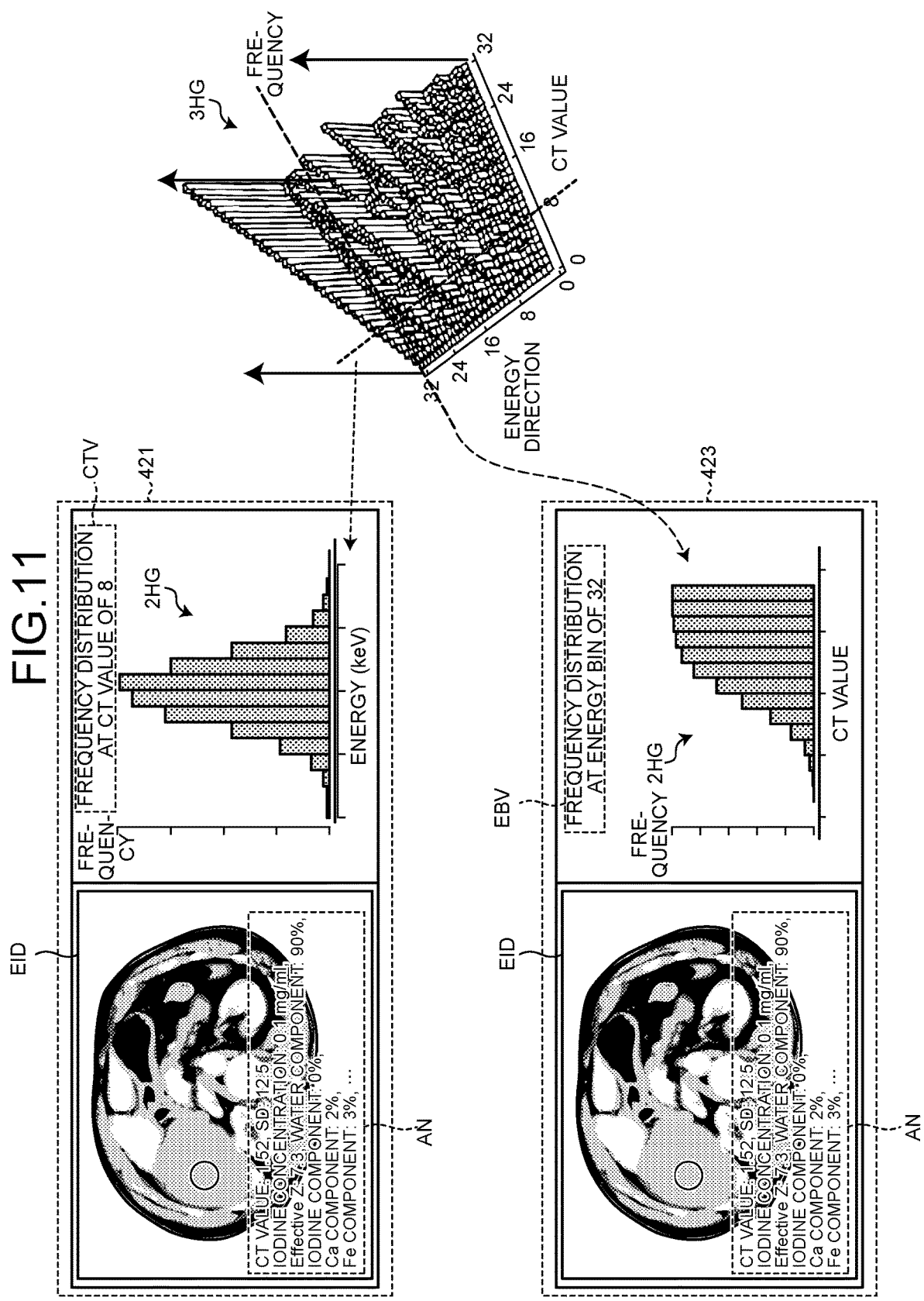
FIG. 11 is a diagram illustrating an example in which the two-dimensional histograms are displayed in a switching manner in accordance with cross sections that are set in a three-dimensional histogram corresponding to a region of interest that is displayed on a display according to a second application example of one embodiment.

In this application example, a two-dimensional histogram related to a cross section that is designated in the three-dimensional histogram 3HG is displayed on the display 42. FIG. 11 is a diagram illustrating an example in which a two-dimensional histogram is displayed in a switching manner in accordance with a cross section that is set in the three-dimensional histogram 3HG corresponding to the ROI that is displayed on the display 42.

As illustrated in FIG. 11, in the three-dimensional histogram 3HG, for example, if a cross section that passes through a CT value of 8 and that is parallel to the energy direction is selected (clicked) in accordance with an instruction that is given by the user via the input interface 43, for example, a display content 421 is displayed on the display 42. Further, as illustrated in FIG. 11, in the three-dimensional histogram 3HG, for example, a cross section that passes through the 32nd energy bin and that is parallel to the direction of the CT value is selected (clicked) in accordance with an instruction that is given by the user via the input interface 43, for example, a display content 423 is displayed on the display 42. In this case, a range of the horizontal axis (the CT value or the energy) in the two-dimensional histogram 2HG is appropriately set.

Meanwhile, as a modification of the present application example, titles (CTV, EBV) that indicate positions of the cross sections with respect to the two-dimensional histograms 2HG illustrated in FIG. 11 may be represented by a slider in a slider bar. That is, the CT value corresponding to the displayed two-dimensional histogram 2HG is represented as a position of the slider in the slider bar that represents values between a maximum value and a minimum value of the CT values.

Further, a value of the energy bin (or the energy keV) corresponding to the displayed two-dimensional histogram 2HG is represented as a position of the slider in the slider bar that represents values between a maximum value and a minimum value of the energy bins (or the energy keV). In the above-described cases, if the slider is moved in accordance with an instruction that is given by the user via the input interface 43, the two-dimensional histogram 2HG is changed in accordance with the position of the moved slider.

If the storage button in the input interface 43 is pressed when the position of the cross section in the three-dimensional histogram 3HG is set or when the position of the slider is confirmed, the management function 448 stores the two-dimensional histogram 2HG at the position of the cross section in the memory 41 in association with the energy integrated image EID in the same flow as described in the embodiment.

According to the medical image processing apparatus 400 of the present application example, by selecting a CT value or an energy bin (energy keV) in the three-dimensional histogram 3HG, it is possible to easily change the frequency distribution related to the ROI that is set in the EID image and display the frequency distribution on the display 42. With this configuration, according to the medical image processing apparatus 400 of the present application example, it is possible to improve throughput of diagnosis on the subject P and improve efficiency of setting of a treatment plan.

Third Application Example

In this application example, an image different from the energy integrated image EID is displayed as an image in which an ROI is set on the display 42. As a medical image related to setting of the ROI, for example, a virtual monochromatic X-ray image related to 120 keV is displayed on the display 42. In this case, as the two-dimensional histogram 2HG, for example, a histogram of CT values at 120 keV is displayed as a default. Subsequently, the arbitrary two-dimensional histogram 2HG is displayed in accordance with an instruction that is given by the user via the input interface 4. Effects of the present application example are the same as those of the embodiment and the other application examples, and therefore, explanation thereof will be omitted.

Fourth Application Example

In this application example, if an energy bin is designated in the two-dimensional histogram 2HG, an energy band image corresponding to the designated energy bin is displayed instead of the energy integrated image EID, the energy band image corresponding to the designated energy bin is displayed in an enhanced manner in the energy integrated image EID, or the energy band image corresponding to the designated energy bin is hidden (for example, displayed with oblique lines, gray out, or the like) in the energy integrated image EID, for example.

Figure 12:
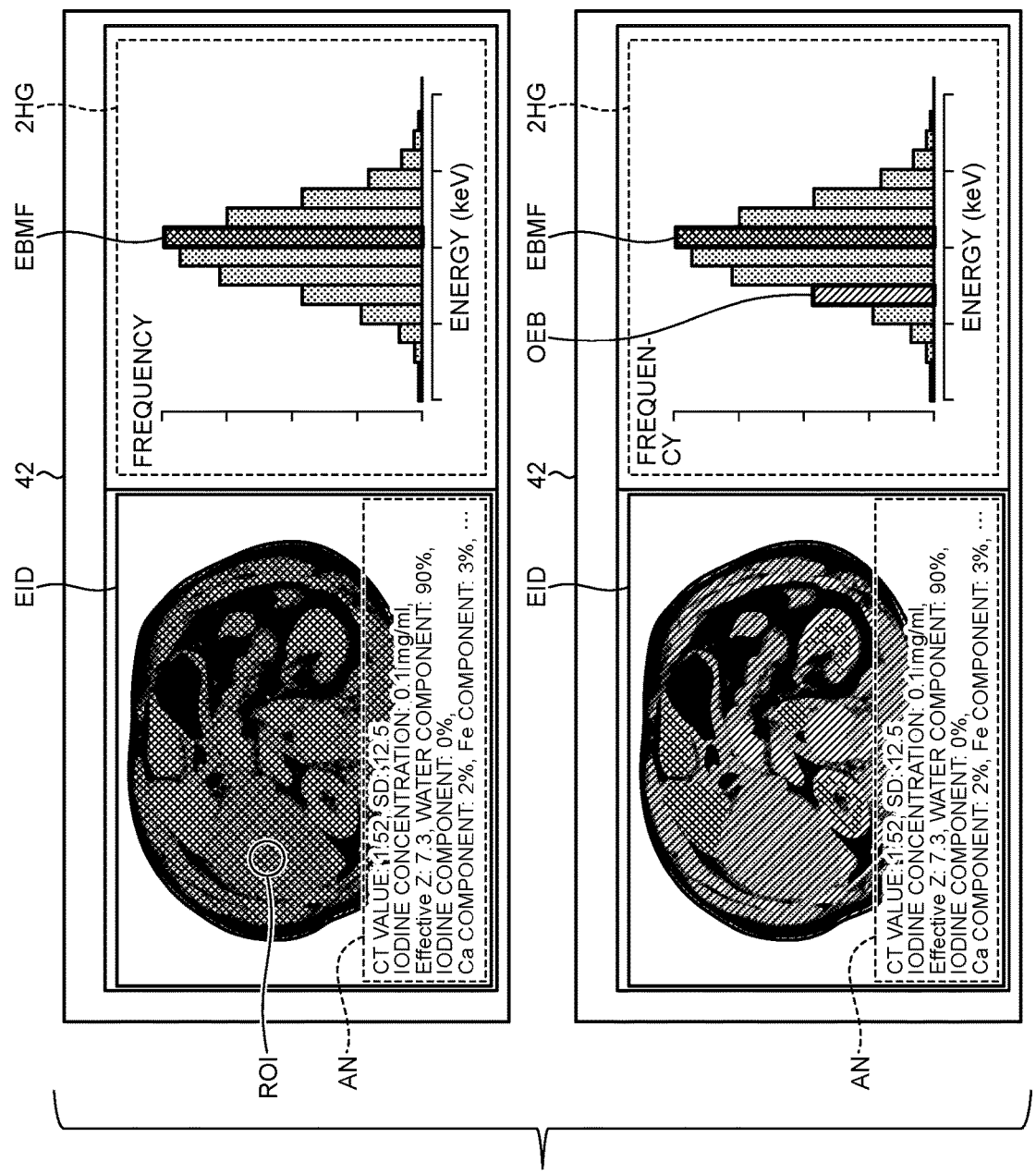
FIG. 12 is a diagram illustrating examples of display of energy integrated images in an enhanced manner in accordance with designation of energy bins according to a fourth application example of one embodiment.

FIG. 12 is a diagram illustrating examples in which the energy integrated images EID are displayed in an enhanced manner with designation of energy bins. As illustrated in an upper part in FIG. 12, if an energy bin EBMF with the maximum frequency is selected, the energy integrated image EID is displayed in an enhanced manner in relation to the selected energy bin EBMF. Further, as illustrated in a lower part in FIG. 12, if the energy bin EBMF with the maximum frequency and another energy bin OEB are selected, the energy integrated image EID is displayed in an enhanced manner in relation to the selected energy bins (EBMF and OEB).

According to the medical image processing apparatus 400 of the present application example, it is possible to change a display mode in the energy integrated image EID in accordance with selection of the energy bin in the two-dimensional histogram 2HG. With this configuration, according to the present application example, it is possible to change a display mode of the medical image related to the two-dimensional histogram 2HG as desired by the user. Thus, according to the medical image processing apparatus 400 of the present application example, it is possible to improve throughput of diagnosis on the subject P and improve efficiency of setting of a treatment plan.

Fifth Application Example

In this application example, at least a single multi planar reconstruction (MPR) image is used as an image that is used for designating an ROI in the medical image processing. The MPR image is, for example, a coronal cross-sectional image at a coronal plane including an imaging site of the subject P, a sagittal cross-sectional image at a sagittal plane including an imaging site of the subject P, or the like. Meanwhile, the image that is used to designate the ROI in the medical image processing is not limited to the MPR image, but may be, for example, a different cross-sectional image, such as a curved planar reconstruction image.

Figure 13:
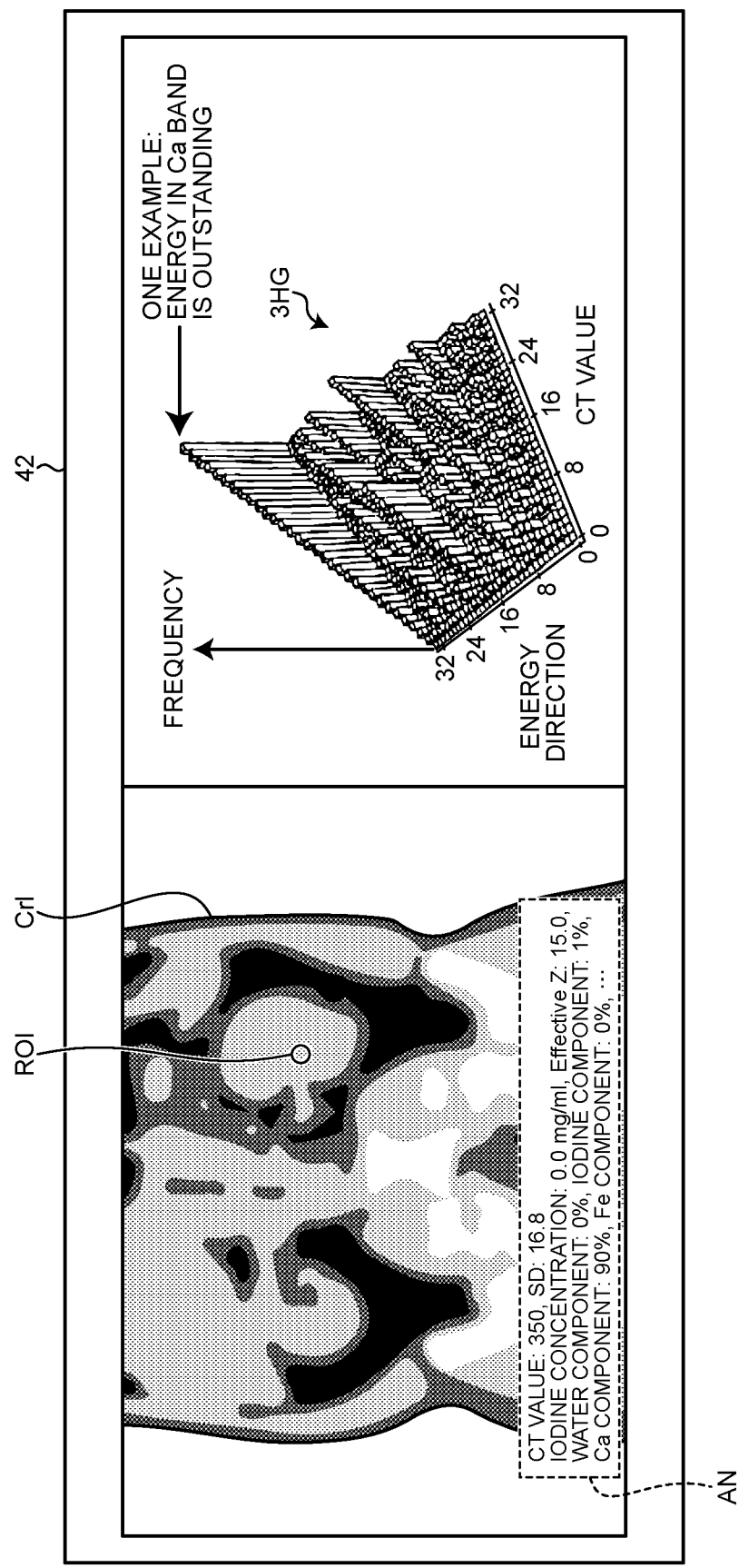
FIG. 13 is a diagram illustrating an example of display of analysis values, the three-dimensional histogram corresponding to the region of interest, and a cross-section converted image according to a fifth application example of one embodiment.

FIG. 13 is a diagram illustrating an example of display of the analysis values AN, the three-dimensional histogram 3HG corresponding to the ROI, and a multi planar reconstruction image CrI. In FIG. 13, the coronal image CrI is displayed, as the multi planar reconstruction image on the display 42 instead of the energy integrated image EID. In FIG. 13, a single multi planar reconstruction image is displayed, but embodiments are not limited to this example, and it may be possible to display a plurality of medical images (other multi planar reconstruction images (a sagittal image, an axial image, or the like). In FIG. 13, an ROI is set in the coronal image CrI.

If a cross section in the three-dimensional histogram 3HG illustrated in FIG. 8 is designated in accordance with an instruction that is given by the user via the input interface 43, the process as described in the second application example is performed. In this case, as illustrated in FIG. 11, the two-dimensional histogram 2HG is displayed on the display 42 together with the coronal image CrI.

According to the medical image processing apparatus 400 of the present application example, it is possible to use at least a single cross-sectional image as the medical image related to setting of the ROI, and display a three-dimensional histogram related to the ROI in the cross-sectional image on the display 42. In addition, according to the present application example, it is possible to set the ROI in an arbitrary cross-sectional image, and, by selecting a CT value or an energy bin (energy keV) in the three-dimensional histogram 3HG, it is possible to easily switch a frequency distribution related to the ROI that is designated in the displayed cross-sectional image and display the frequency distribution on the display 42. With this configuration, according to the medical image processing apparatus 400 of the present application example, it is possible to improve throughput of diagnosis on the subject P and improve efficiency of setting of a treatment plan.

Sixth Application Example

In this application example, a series of pieces of energy bin data that are successively generated in chronological order by dynamic PCCT scan or the like are acquired, and a series of the chronological three-dimensional histograms 3HG are displayed on the display 42. That is, in the present application example, the processing circuitry 44 acquires, by the acquisition function 443, a series of pieces of energy bin data that are successively generated in chronological order by dynamic PCCT scan or the like. Subsequently, the processing circuitry 44 reconstructs, by the reconstruction processing function 444, a series of the energy band images EBI in chronological order. Subsequently, the processing circuitry 44 generates, by the image processing function 445, a series of the energy integrated images EID in chronological order based on the series of chronological energy band images EBI.

If an ROI is set in the energy integrated image EID or a different cross-sectional image, the processing circuitry 44 generates, by the generation function 447, the plurality of three-dimensional histograms 3HG in chronological order in relation to the set ROI. In this case, the management function 448 manages a plurality of medical images of the same cross section as the cross section of the subject P related to setting of the ROI and the plurality of three-dimensional histograms 3HG in an associated manner. With this configuration, the series of chronological medical images and the series of chronological three-dimensional histograms 3HG are associated with each other. The display 42 dynamically displays the medical images of the cross section related to the setting of the ROI and the three-dimensional histograms 3HG in an associated manner in accordance with a time phase.

The processing circuitry 44 performs, by the image processing function 445, analysis of temporal change of the frequency and/or a frequency analysis of the frequency with respect to the plurality of three-dimensional histograms 3HG in chronological order. Meanwhile, the analysis process on the plurality of chronological three-dimensional histograms 3HG is not limited to the analysis of temporal change of the frequency and the frequency analysis, but a different analysis method, such as eigenvalue decomposition, for chronological data may be adopted.

With this configuration, the image processing function 445 determines various functions in the ROI based on an analysis result (hereinafter, referred to as a histogram analysis result) on the plurality of chronological three-dimensional histograms 3HG. For example, if the ROI is a kidney, the image processing function 445 evaluates (determines) kidney functions, such as a degree of filtration of a contrast agent (for example, a degree of disappearance of iodine from the subject P) based on a result of analysis of the histogram. Further, for example, if the ROI is a muscle, the image processing function 445 evaluates (determines) muscle functionality (for example, pain impulse) based on the result of the analysis of the histogram.

The processing circuitry 44 manages, by the management function 448, the three-dimensional histogram 3HG, the two-dimensional histogram 2HG, the analysis result, and the like by, for example, a private tag using header information on the chronological data related to the energy integrated image EID and header information on the plurality of pieces of energy bin data, or the like. With this configuration, the management function 448 stores the chronological energy integrated images EID, the three-dimensional histogram 3HG, the two-dimensional histogram 2HG, and the analysis result in an associated manner in the memory 41.

According to the medical image processing apparatus 400 of the present application example, by generating and analyzing the plurality of chronological three-dimensional histograms 3HG, it is possible to evaluate and determine various functions in the ROI. Thus, according to the medical image processing apparatus 400 of the present application example, it is possible to improve throughput of diagnosis on the subject P and improve efficiency of setting of a treatment plan.

If the technical idea of the embodiment is implemented by the medical image processing method, the medical image processing method includes acquiring a plurality of pieces of energy bin data that are generated based on photon counting CT scan, reconstructing a plurality of energy band images based on the plurality of pieces of energy bin data, and generating, based on the plurality of energy band images, a three-dimensional histogram that is based on a plurality of pixel values and a plurality of energy bands included in the plurality of energy band images. The flow and the effects of the medical image processing implemented by the medical image processing method are the same as those of the embodiment, and therefore, explanation thereof will be omitted.

If the technical idea of the embodiment is implemented by a medical image processing program, the medical image processing program causes a computer to acquire a plurality of pieces of energy bin data that are generated based on photon counting CT scan, reconstruct a plurality of energy band images based on the plurality of pieces of energy bin data, and generate, based on the plurality of energy band images, a three-dimensional histogram that is based on a plurality of pixel values and a plurality of energy bands included in the plurality of energy band images. The medical image processing program is stored in, for example, a computer-readable non-volatile storage medium.

For example, the medical image processing may be implemented by installing the medical image processing program from a non-volatile storage medium to various kinds of server apparatuses (medical image processing apparatuses) related to medical data processing and loading the medical image processing program on a memory. In this case, a program that is able to cause a computer to implement the method may be distributed by being stored in a storage medium, such as a magnetic disk (hard disk or the like), an optical disk (a CD-ROM, a DVD, or the like), or a semiconductor memory. The flow and the effects of the medical image processing implemented by the medical image processing program are the same as those of the embodiment, and therefore, explanation thereof will be omitted.

According to at least one embodiment as described above, it is possible to improve operation performance in relation to calculation and display of an analysis value that is specific to scan that is able to distinguish a plurality of energies.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical image processing apparatus comprising:
processing circuitry that
acquires a plurality of pieces of energy bin data that are generated based on execution of photon counting CT scan,
reconstructs a plurality of energy band images based on the plurality of pieces of energy bin data, and
generates, based on the plurality of energy band images, a three-dimensional histogram that is based on a plurality of pixel values and a plurality of energy bands included in the plurality of energy band images.

2. The medical image processing apparatus according to claim 1, wherein
the processing circuitry
generates an energy integrated image corresponding to all of energies that are integrated over a plurality of energy bins based on the plurality of energy band images,
sets, based on a position of a region of interest that is set in the energy integrated image, the region of interest at a same position as the position in each of the energy band images, and
generates the three-dimensional histogram related to the region of interest based on pixel values in the regions of interest in the plurality of energy band images.

3. The medical image processing apparatus according to claim 2, wherein
the processing circuitry further generates information based on the three-dimensional histogram,
the medical image processing apparatus further comprising:
a display that displays the information.

4. The medical image processing apparatus according to claim 3, wherein
the processing circuitry generates, as the information, a two-dimensional histogram that corresponds to a specific cross section of a subject and that represents energies of X-rays over the plurality of energy bins and frequencies of pixel values of the plurality of energy band images, and
the display displays the two-dimensional histogram.

5. The medical image processing apparatus according to claim 1, wherein the processing circuitry generates abundance ratios of a plurality of materials at a cross section of a subject based on the three-dimensional histogram.

6. The medical image processing apparatus according to claim 5, wherein the processing circuitry generates the abundance ratios in a region of interest that is set in the cross section, by using a trained model that outputs the abundance ratios upon input of the three-dimensional histogram.

7. The medical image processing apparatus according to claim 6, wherein the trained model is trained in advance so as to correspond to a plurality of known materials, adopt, as input, pixel values of a plurality of energy band images corresponding to the plurality of pieces of energy bin data, energies of X-rays over the plurality of energy bins, and a plurality of three-dimensional histograms that represent frequencies of the pixel values, and adopt output as combined information.

8. The medical image processing apparatus according to claim 2, wherein the processing circuitry manages the three-dimensional histogram in association with the energy integrated image by using one of header information on chronological data related to the energy integrated image and header information on a plurality of pieces of energy bin data.

9. The medical image processing apparatus according to claim 4, wherein the processing circuitry manages the two-dimensional histogram in association with the energy integrated image by using one of header information on chronological data related to the energy integrated image and header information on a plurality of pieces of energy bin data.

10. A medical image processing method comprising:
acquiring a plurality of pieces of energy bin data that are generated based on execution of photon counting CT scan,
reconstructing a plurality of energy band images based on the plurality of pieces of energy bin data, and
generating, based on the plurality of energy band images, a three-dimensional histogram that is based on a plurality of pixel values and a plurality of energy bands included in the plurality of energy band images.

* * * * *